United States Patent
Watanabe

(10) Patent No.: US 9,725,588 B2
(45) Date of Patent: Aug. 8, 2017

(54) METHACRYLIC RESIN COMPOSITION, METHOD FOR PRODUCING THE SAME, AND MOLDED ARTICLE

(71) Applicant: Asahi Kasei Chemicals Corporation, Tokyo (JP)

(72) Inventor: Masahiro Watanabe, Tokyo (JP)

(73) Assignee: ASAHI KASEI CHEMICALS CORPORATION, Tokyo (JP)

(*) Notice: Subject to any disclaimer, the term of this patent is extended or adjusted under 35 U.S.C. 154(b) by 0 days.

(21) Appl. No.: 15/063,932

(22) Filed: Mar. 8, 2016

(65) Prior Publication Data

US 2016/0264771 A1  Sep. 15, 2016

(30) Foreign Application Priority Data

Mar. 9, 2015 (JP) ................................. 2015-046025
Jan. 18, 2016 (JP) ................................. 2016-007220

(51) Int. Cl.
*C08L 83/00* (2006.01)
*C08L 33/12* (2006.01)

(52) U.S. Cl.
CPC .................................... *C08L 33/12* (2013.01)

(58) Field of Classification Search
CPC ................................. C08L 33/12; C08L 13/00
See application file for complete search history.

(56) References Cited

U.S. PATENT DOCUMENTS 5,053,461 A * 10/1991 Tone ..................... C08F 265/06
525/243
7,964,690 B2 * 6/2011 Azuma ................. C08F 220/14
428/220
8,617,708 B2 * 12/2013 Murakami .............. C08F 2/001
428/402
2015/0299360 A1 * 10/2015 Murakami ........... C08F 220/18
428/220

FOREIGN PATENT DOCUMENTS

JP     11-322860 A     11/1999
JP     2012-087251 A    5/2012

* cited by examiner

*Primary Examiner* — Hannah Pak
(74) *Attorney, Agent, or Firm* — Birch, Stewart, Kolasch & Birch, LLP

(57) ABSTRACT

It is intended to obtain a methacrylic resin composition that has high transparency, is excellent in fluidity and heat resistance, and is low variable in impact resistance. The present invention provides a methacrylic resin composition containing predetermined amounts of a predetermined methacrylic resin (A) and a predetermined rubber polymer (B) and satisfying the following conditions (I) to (III): (I) the weight-average molecular weight is 40000 to 300000; (II) the area of a molecular weight range of 15000 to 30000 in a differential molecular weight distribution curve obtained from the GPC elution curve is 10 to 70% in terms of a ratio to the total area obtained from the differential molecular weight distribution curve; and (III) when arbitrary 10 fields of view of the methacrylic resin composition are observed at a magnification of 50000 times under a transmission electron microscope, a plurality of aggregates each containing a plurality of particles of the rubber polymer (B) are present, the plurality of aggregates include an aggregate α, and 0 or more and 10 or less rubber polymer particles (Bα) entirely surrounded by other rubber polymer particles are present in the aggregate α, and the average number of the rubber polymer particles (Bα) is 0 or more and 10 or less per one of the 10 fields of view.

9 Claims, 3 Drawing Sheets

METHACRYLIC RESIN COMPOSITION, METHOD FOR PRODUCING THE SAME, AND MOLDED ARTICLE

BACKGROUND OF THE INVENTION

Field of the Invention

The present invention relates to a methacrylic resin composition, a method for producing the same, and a molded article.

Description of the Related Art

Methacrylic resins typified by polymethyl methacrylate (PMMA) have high transparency and as such, have heretofore been used in a wide range of fields such as optical materials, parts for vehicles, building materials, lenses, household goods, office automation equipment, and lighting equipment.

In recent years, the methacrylic resins have been increasingly used, particularly, in lifestyle products other than optical materials such as materials for vehicles, light guide panels, or films for liquid crystal displays, and their shapes are complicated, thin, and long. The conventional methacrylic resin compositions therefore tend to have the difficulty in molding processes.

In response to such a multitude of growing needs, there has been a demand for a methacrylic resin composition that has higher impact resistance and heat resistance, and higher fluidity than those of the conventional methacrylic resin compositions, while maintaining transparency.

A technique of blending an acrylic rubber polymer with a methacrylic resin has heretofore been known in order to improve impact resistance. In this case, however, there is a tendency to improve impact resistance, but to reduce transparency, heat resistance, and fluidity. Thus, balanced physical properties are very difficult to exert.

A technique of further blending a polymer having a relatively low viscosity with a methacrylic resin composition containing a rubber polymer has also been known in order to improve the fluidity of the methacrylic resin composition. In this case, however, the dispersibility of the rubber polymer tends to be deteriorated with increase in the difference in the viscosity between the low viscous polymer to be blended and the rubber polymer.

Furthermore, a technique of blending a rubber-like elastic body with an acrylic resin, to impart impact resistance to an acrylic resin composition without impairing transparency, has heretofore been known (see e.g., Patent Literature 1).

A technique of specifying the ratios of components having a molecular weight of 1/5 or less of a peak molecular weight (Mp) to thereby obtain an acrylic resin composition, which is composed of an acrylic resin and a rubber polymer and is improved in terms of fluidity, impact resistance, and heat resistance, has also been known (see e.g., Patent Literature 2).

CITATION LIST

Patent Literature

[Patent Literature 1] Japanese Patent Laid-Open No. H11-322860
[Patent Literature 2] Japanese Patent Laid-Open No. 2012-87251

The acrylic resin composition obtained by the technique of Patent Literature 1 provides the effect of imparting impact resistance, but disadvantageously has insufficient fluidity and heat resistance, and its impact resistance is also insufficient.

The acrylic resin composition obtained by the technique of Patent Literature 2 has favorable balance among fluidity, impact resistance, and heat resistance, but does not necessarily have high levels of these physical properties and has insufficient dispersibility of the rubber polymer, leading to possible variations in physical properties such as transparency or mechanical strength.

Thus, an object of the present invention is to provide a methacrylic resin composition that has high transparency and is excellent in fluidity and heat resistance though containing a rubber polymer for improving impact resistance, and is low variable in impact resistance, a method for producing the same, and a molded article.

BRIEF SUMMARY OF THE INVENTION

The present inventors have conducted diligent studies to solve the problems of the conventional techniques mentioned above and consequently completed the present invention by finding out that a methacrylic resin composition, which has a predetermined weight-average molecular weight and contains a methacrylic resin having a particular molecular weight range in a predetermined amount and a predetermined rubber polymer, has high transparency, is excellent in fluidity and heat resistance, and is low variable in impact resistance.

Specifically, the present invention is as follows:

[1] A methacrylic resin composition containing:

(A) a methacrylic resin containing 70 to 100% by mass of a methacrylic acid ester monomer unit, and 0 to 30% by mass of at least one additional vinyl monomer unit copolymerized with a methacrylic acid ester, and (B) a rubber polymer having an average particle size of 0.04 to 1.0 μm, wherein the methacrylic resin composition contains the methacrylic resin (A) and the rubber polymer (B) at a ratio of 30:70 to 74:26% by mass, and satisfies the following conditions (I) to (III):

(I) a weight-average molecular weight (Mw) measured by the gel permeation chromatography (GPC) of a component dissolved in tetrahydrofuran (THF) is 40000 to 300000;

(II) an area of a molecular weight range of 15000 to 30000 in a differential molecular weight distribution curve obtained from a GPC elution curve is 10 to 70% in terms of a ratio to a total area obtained from the differential molecular weight distribution curve; and (III) when arbitrary 10 fields of view of the methacrylic resin composition are observed at a magnification of 50000 times under a transmission electron microscope, a plurality of aggregates each containing a plurality of particles of the rubber polymer (B) are present, the plurality of aggregates include an aggregate α, and 0 or more and 10 or less rubber polymer particles (Bα) entirely surrounded by other rubber polymer particles are present in the aggregate α, and an average number of the rubber polymer particles (Bα) is 0 or more and 10 or less per one of the 10 fields of view.

[2] The methacrylic resin composition according to [1], wherein the rubber polymer (B) is an acrylic rubber polymer.

[3] The methacrylic resin composition according to [1] or [2], wherein the rubber polymer (B) has a multilayer structure having two or more layers.

[4] A method for producing a methacrylic resin composition according to any of [1] to [3], including:
melt-kneading a methacrylic resin having a weight-average molecular weight (Mw) of 40000 to 350000 and the rubber polymer (B) to obtain a mixture; and
adding a methacrylic resin having a weight-average molecular weight (Mw) of 5000 to 40000 to the mixture.

[5] A molded article containing a methacrylic resin composition according to any of [1] to [3].

[6] The molded article according to [5], wherein the molded article is an injection-molded article.

[7] The molded article according to [5], wherein the molded article is an extrusion-molded article.

[8] The molded article according to any of [5] to [7], wherein the molded article is any article selected from the group consisting of optical components, electrical or electronical components, sundry goods, and parts for vehicles.

[9] The molded article according to any of [5] to [8], wherein the molded article is a thin long component having a long side of 100 mm or larger and a thickness of 3 mm or smaller.

The methacrylic resin composition obtained according to the present invention has high transparency, is excellent in fluidity and heat resistance, and is low variable in impact resistance.

DETAILED DESCRIPTION OF THE INVENTION

Figure 1:
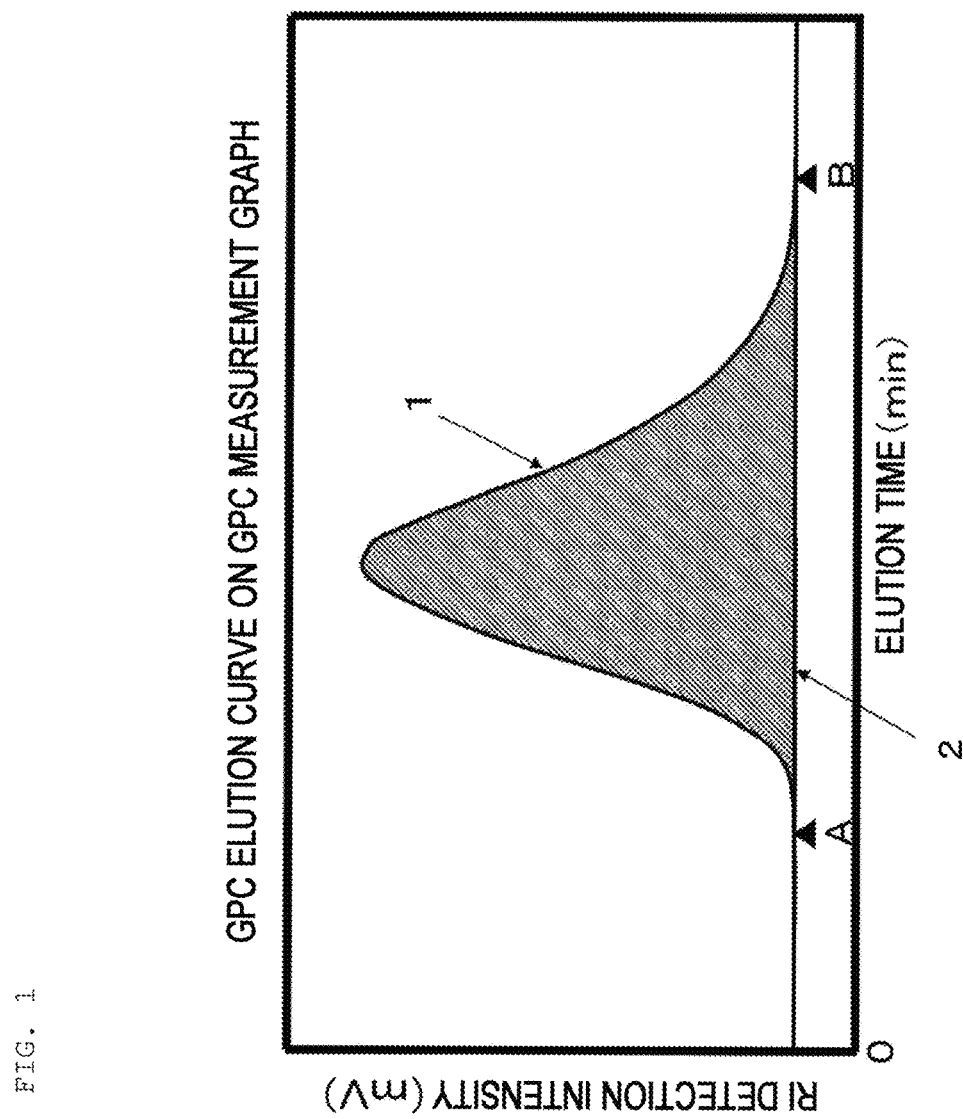
FIG. 1 shows a diagrammatic view of a GPC elution curve on a GPC measurement graph.

Hereinafter, an embodiment for carrying out the present invention (hereinafter, referred to as the "present embodiment") will be described in detail. However, the present invention is not limited by the embodiment below, and various changes or modifications can be made therein without departing from the spirit of the present invention.

In the present specification, each monomer component before polymerization is referred to as a "XX monomer". In this case, the term "monomer" may be omitted. On the other hand, each constituent unit constituting a polymer is referred to as a "XX monomer unit".

[Methacrylic Resin Composition]

The methacrylic resin composition of the present embodiment contains (A) a methacrylic resin containing 70 to 100% by mass of a methacrylic acid ester monomer unit, and 0 to 30% by mass of at least one additional vinyl monomer unit copolymerized with the methacrylic acid ester, and (B) a rubber polymer having an average particle size of 0.04 to 1.0 μm, wherein the methacrylic resin composition contains the methacrylic resin (A) and the rubber polymer (B) at a ratio of 30:70 to 74:26% by mass. The methacrylic resin composition of the present embodiment further satisfies the following conditions (I) to (III):

(I) the weight-average molecular weight (Mw) measured by the gel permeation chromatography (GPC) of a component dissolved in tetrahydrofuran (THF) is 40000 to 300000;

(II) the area of a molecular weight range of 15000 to 30000 in a differential molecular weight distribution curve obtained from the GPC elution curve is 10 to 70% in terms of a ratio to the total area obtained from the differential molecular weight distribution curve; and (III) when arbitrary 10 fields of view of the methacrylic resin composition are observed at a magnification of 50000 times under a transmission electron microscope,
a plurality of aggregates each containing a plurality of particles of the rubber polymer (B) are present,
the plurality of aggregates include an aggregate α, and 0 or more and 10 or less rubber polymer particles (Bα) entirely surrounded by other rubber polymer particles are present in the aggregate α, and
the average number of the rubber polymer particles (Bα) is 0 or more and 10 or less per one of the 10 fields of view.

(Methacrylic Resin (A))

The methacrylic resin (A) contained in the methacrylic resin composition of the present embodiment contains 70 to 100% by mass of a methacrylic acid ester monomer unit and 0 to 30% by mass of at least one additional vinyl monomer unit copolymerized with the methacrylic acid ester monomer.

<Methacrylic Acid Ester Monomer>

The methacrylic acid ester monomer for forming the methacrylic acid ester monomer unit in the methacrylic resin (A) is not limited as long as the effects of the present invention can be provided. Preferred examples thereof include a monomer represented by the following general formula (1):

In the general formula (1), $R_1$ represents a methyl group.

$R_2$ represents a hydrocarbon group having 1 to 18 carbon atoms in which a hydrogen atom on carbon may be substituted with a hydroxy group or a halogen group.

Examples of the methacrylic acid ester monomer include, but are not limited to, methyl methacrylate, ethyl methacrylate, propyl methacrylate, isopropyl methacrylate, butyl methacrylate, isobutyl methacrylate, cyclohexyl methacrylate, phenyl methacrylate, (2-ethylhexyl) methacrylate, (t-butylcyclohexyl) methacrylate, benzyl methacrylate, and (2,2,2-trifluoroethyl) methacrylate.

The methacrylic acid ester monomer is preferably methyl methacrylate, ethyl methacrylate, propyl methacrylate, or the like, more preferably methyl methacrylate, from the viewpoint of handleability and easy availability.

Only one of these methacrylic acid ester monomers may be used alone, or two or more thereof may be used in combination.

<Additional Vinyl Monomer Copolymerizable with Methacrylic Acid Ester Monomer>

The additional vinyl monomer copolymerizable with the methacrylic acid ester monomer mentioned above for forming the methacrylic resin (A) is not limited as long as the effects of the present invention can be provided. Preferred examples thereof include an acrylic acid ester monomer represented by the following general formula (2):

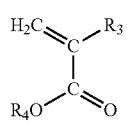 (2)

In the general formula (2), $R_3$ represents a hydrogen atom.

$R_4$ represents a hydrocarbon group having 1 to 18 carbon atoms in which a hydrogen atom on carbon may be substituted with a hydroxy group or a halogen group.

Examples of the acrylic acid ester monomer represented by the general formula (2) include, but are not limited to, methyl acrylate, ethyl acrylate, propyl acrylate, isopropyl acrylate, butyl acrylate, isobutyl acrylate, cyclohexyl acrylate, phenyl acrylate, (2-ethylhexyl) acrylate, (t-butylcyclohexyl) acrylate, benzyl acrylate, and (2,2,2-trifluoroethyl) acrylate.

The acrylic acid ester monomer is preferably methyl acrylate, ethyl acrylate, propyl acrylate, isopropyl acrylate, butyl acrylate, isobutyl acrylate, or the like, more preferably methyl acrylate, from the viewpoint of handleability and easy availability.

Examples of the additional vinyl monomer other than the acrylic acid ester monomer of the general formula (2), copolymerizable with the methacrylic acid ester monomer include, but are not limited to: α,β-unsaturated acids such as acrylic acid and methacrylic acid; unsaturated group-containing divalent carboxylic acids such as maleic acid, fumaric acid, itaconic acid, and cinnamic acid, and their alkyl esters; styrene monomers such as styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, and isopropenylbenzene(α-methylstyrene); aromatic vinyl compounds such as 1-vinylnaphthalene, 2-vinylnaphthalene, 1,1-diphenylethylene, isopropenyltoluene, isopropenylethylbenzene, isopropenylpropylbenzene, isopropenylbutylbenzene, isopropenylpentylbenzene, isopropenylhexylbenzene, and isopropenyloctylbenzene; vinyl cyanide compounds such as acrylonitrile and methacrylonitrile; unsaturated carboxylic anhydrides such as maleic anhydride and itaconic anhydride; maleimide and N-substituted maleimides such as N-methylmaleimide, N-ethylmaleimide, N-phenylmaleimide, and N-cyclohexylmaleimide; amides such as acrylamide and methacrylamide; ethylene glycol or an oligomer thereof esterified at both terminal hydroxy groups by acrylic acid or methacrylic acid, such as ethylene glycol di(meth)acrylate, diethylene glycol di(meth)acrylate, triethylene glycol di(meth)acrylate, and tetraethylene glycol di(meth)acrylate; alcohols esterified at two hydroxy groups by acrylic acid or methacrylic acid, such as neopentyl glycol di(meth)acrylate and di(meth)acrylate; polyhydric alcohol derivatives (trimethylolpropane, pentaerythritol, etc.) esterified by acrylic acid or methacrylic acid; and polyfunctional monomers such as divinylbenzene.

Only one of these acrylic acid ester monomers of the general formula (2) or vinyl monomers other than the acrylic acid ester monomer of the general formula (2), copolymerizable with the methacrylic acid ester monomer may be used alone, or two or more thereof may be used in combination.

<Content of Methacrylic Resin (A)>

The content of the methacrylic resin (A) in the methacrylic resin composition of the present embodiment is 30 to 74% by mass, preferably 30 to 72% by mass, more preferably 30 to 70% by mass, further preferably 32 to 69% by mass, still further preferably 35 to 69% by mass, even preferably 40 to 68% by mass, still even preferably 45 to 67% by mass, with respect to 100% by mass in total of the methacrylic resin (A) and the rubber polymer (B).

The methacrylic resin composition containing the methacrylic resin (A) at the content of 74% by mass or less has favorable balance between fluidity and heat resistance. The methacrylic resin composition containing the methacrylic resin (A) at the content of 30% by mass or more has favorable transparency.

<Method for Producing Methacrylic Resin (A)>

The methacrylic resin (A) of the present embodiment can be polymerized by any polymerization method selected from the group consisting of bulk polymerization, solution polymerization, suspension polymerization, and emulsion polymerization methods. The polymerization method is preferably any of bulk polymerization, solution polymerization and suspension polymerization methods, more preferably a solution polymerization or suspension polymerization method.

The polymerization temperature can be appropriately selected as the optimum polymerization temperature according to the polymerization method and is preferably 50° C. or higher and 100° C. or lower, more preferably 60° C. or higher and 90° C. or lower.

A polymerization initiator may be used for producing the methacrylic resin (A).

Examples of the polymerization initiator for radical polymerization include, but are not limited to: organic peroxides such as di-t-butyl peroxide, lauroyl peroxide, stearyl peroxide, benzoyl peroxide, t-butyl peroxyneodecanoate, t-butyl peroxypivalate, dilauroyl peroxide, dicumyl peroxide, t-butyl peroxy-2-ethylhexanoate, 1,1-bis(t-butylperoxy)-3,3,5-trimethylcyclohexane, and 1,1-bis(t-butylperoxy)cyclohexane; and general azo radical polymerization initiators such as azobisisobutyronitrile, azobisisovaleronitrile, 1,1-azobis(1-cyclohexanecarbonitrile), 2,2'-azobis-4-methoxy-2,4-azobisisobutyronitrile, 2,2'-azobis-2,4-dimethylvaleronitrile, and 2,2'-azobis-2-methylbutyronitrile.

Only one of these polymerization initiators may be used alone, or two or more thereof may be used in combination.

The polymerization initiator for radical polymerization mentioned above may be used as a redox initiator in combination with an appropriate reducing agent.

The amount of the polymerization initiator and/or the redox initiator used is generally in the range of 0 to 1 parts by mass with respect to 100 parts by mass in total of all monomers used in the polymerization for the methacrylic resin (A) and can be appropriately selected in consideration of the polymerization temperature and the half-life of the polymerization initiator.

In the case of producing the methacrylic resin (A) by the solution polymerization method at a high temperature of 90° C. or higher, it is preferred to use a polymerization initiator, such as a peroxide or an azobis initiator, which has a 10-hour half-life temperature of 80° C. or higher and is soluble in an organic solvent used.

For the production of the methacrylic resin (A), the molecular weight of the methacrylic resin (A) may be appropriately controlled as long as its weight-average molecular weight (Mw) measured by gel permeation chromatography (GPC) falls within the range of 40000 to 300000, as mentioned later.

Examples of the method for controlling the molecular weight of the methacrylic resin (A) include, but are not limited to, a method which involves controlling the molecular weight by using a chain transfer agent (e.g., alkylmercaptans, dimethylacetamide, dimethylformamide, and triethylamine), an iniferter (e.g., dithiocarbamates, triphenylmethylazobenzene, and tetraphenylethane derivatives), or the like.

Alternatively, the molecular weight may be adjusted by adjusting the amount of such a molecular weight-controlling agent added.

The chain transfer agent is preferably an alkylmercaptan from the viewpoint of handleability and stability. Examples of the alkylmercaptan include, but are not limited to, n-butylmercaptan, n-octylmercaptan, n-dodecylmercaptan, t-dodecylmercaptan, n-tetradecylmercaptan, n-octadecylmercaptan, 2-ethylhexyl thioglycolate, ethylene glycol dithioglycolate, trimethylolpropane tris(thioglycolate), and pentaerythritol tetrakis(thioglycolate).

The molecular weight-controlling agent can be appropriately added according to the target molecular weight of the methacrylic resin (A) and is generally used in the range of 0.001 parts by mass to 5 parts by mass with respect to 100 parts by mass in total of all monomers used in the polymerization for the methacrylic resin (A).

Other examples of the method for controlling the molecular weight include a method which involves altering the polymerization method, a method which involves adjusting the amount of the polymerization initiator, and a method which involves changing various polymerization conditions such as the polymerization temperature.

Only one of these methods for controlling the molecular weight may be used alone, or two or more of the methods may be used in combination.

(Rubber Polymer (B))

The methacrylic resin composition of the present embodiment contains the rubber polymer (B).

Examples of the rubber polymer (B) that can be used include, but are not limited to, particles of general butadiene-containing ABS rubbers, and organic rubbers such as acrylic, polyolefin, silicon, and fluorine rubbers.

The rubber polymer (B) is rubber particles having an average particle size of 0.04 to 1.0 μm as mentioned later and is particularly preferably rubber particles having a multilayer structure having two or more layers, more preferably an acrylic multilayer rubber having a multilayer structure having two or more layers, from the viewpoint of compatibility with the methacrylic resin (A) mentioned above.

Rubber particles having a multilayer structure having three or more layers rather than two layers are particularly preferably used because these rubber particles tend to prevent the resin composition from being thermally degraded during a molding process and the rubber particles from being deformed by heating, and to achieve maintenance of the heat resistance of the molded article and suppression of its thermal deformation.

The rubber particles having a multilayer structure having three or more layers refer to rubber particles having a multilayer structure in which soft layer(s) made of a rubbery polymer and hard layer(s) made of a glassy polymer are stacked. Examples of the multilayer structure include soft-hard-soft-hard, soft-hard-hard, soft-soft-hard, hard-soft-hard, hard-hard-soft-hard, and hard-soft-hard-hard structures (the innermost layer is written on the left side). The rubber particles having a multilayer structure having three or more layers are preferably particles having a three-layer structure composed of the hard layer, the soft layer, and the hard layer in this order from the innermost side, or particles having a four-layer structure composed of the hard layer, the hard layer, the soft layer, and the hard layer or the hard layer, the soft layer, the hard layer, and the hard layer in this order from the innermost side.

The rubber particles having hard layers as both innermost and outermost layers tend to be prevented from being deformed. The rubber particles having a soft component in the middle layer tend to be provided with favorable toughness.

When the rubber polymer (B) contains, for example, an acrylic rubber having a three-layer structure, preferred examples of the acrylic acid ester monomer unit in the copolymer for forming the innermost layer (b-i) include, but are not limited to, n-butyl acrylate and 2-hexyl acrylate.

When the innermost layer (b-i) of the rubber polymer (B) contains an aromatic vinyl compound monomer unit as a copolymer component, the same aromatic vinyl monomer as that used in the methacrylic resin (A) can be used for aromatic vinyl compound monomer unit. Preferably, styrene or a derivative thereof is used.

When the innermost layer (b-i) of the rubber polymer (B) contains a copolymerized polyfunctional monomer unit, examples of the copolymerized polyfunctional monomer unit include, but are not limited to, ethylene glycol di(meth)acrylate, polyethylene glycol di(meth)acrylate, 1,3-butylene glycol di(meth)acrylate, 1,4-butanediol di(meth)acrylate, allyl (meth)acrylate, triallyl isocyanurate, diallyl maleate, and divinylbenzene.

These monomer units can each be used alone or can be used in combination of two or more thereof.

Among the compounds described above, allyl (meth)acrylate is particularly preferred.

When the rubber polymer (B) contains acrylic rubber particles having a three-layer structure, the copolymer for forming the middle layer (b-ii) is preferably a copolymer that exhibits soft rubber elasticity from the viewpoint of imparting excellent toughness to the methacrylic resin composition of the present embodiment.

When the monomer unit constituting the copolymer for forming the middle layer (b-ii) is an acrylic acid ester monomer unit, preferred examples of the acrylic acid ester monomer include, but are not limited to, methyl acrylate, ethyl acrylate, n-butyl acrylate, and 2-ethylhexyl acrylate. Only one of these monomers may be used alone, or two or more thereof may be used in combination.

Particularly, n-butyl acrylate or 2-hexyl acrylate is preferred.

In the case of using an aromatic vinyl compound monomer as a monomer to be copolymerized with the acrylic acid ester monomer to constitute the copolymer for forming the middle layer (b-ii), the aromatic vinyl compound monomer is preferably styrene or a derivative thereof.

When the copolymer for forming the middle layer (b-ii) contains a copolymerized polyfunctional monomer unit, the same copolymerized polyfunctional monomer as that used in the innermost layer (b-i) mentioned above can be used for the copolymerized polyfunctional monomer unit. The content thereof is preferably 0.1% by mass or more and 5% by mass or less because the resulting copolymer has a favorable cross-linking effect and tends to offer moderate cross-linking and a large rubber elastic effect.

When the rubber polymer (B) contains acrylic rubber particles having a three-layer structure, the outermost layer (b-iii) of the acrylic rubber particles is preferably a copolymer of methyl methacrylate and a monomer unit copolymerized with the methyl methacrylate.

Preferred examples of the monomer unit copolymerized with the methyl methacrylate include, but are not limited to, n-butyl acrylate and 2-hexyl acrylate.

The rubber polymer (B) contained in the methacrylic resin composition of the present embodiment has an average particle size of 0.04 to 1.0 μm. The average particle size is preferably 0.05 μm to 0.7 μm, more preferably 0.05 μm to 0.5 μm, further preferably 0.05 μm to 0.4 μm, still further preferably 0.05 μm to 0.3 μm.

The rubber polymer having the average particle size of 0.04 μm or larger tends to provide adequate impact strength. The rubber polymer, which has the average particle size of 1 μm or smaller and is not contained in a certain amount or more (amount that results in 65% by mass or more of an acetone-insoluble portion), can provide adequate characteristics as a rubber elastic body. Thus, a molded article finally obtained from the resulting methacrylic resin composition has favorable surface appearance and has mirror-like appearance. In addition, the methacrylic resin composition, when molded by heating, can prevent reduction in surface gloss even at a stretched portion, and can maintain excellent transparency.

A method conventionally known in the art can be used as a method for measuring the average particle size of the rubber polymer (B). Preferred examples of the measurement method include, but are not limited to, the following methods (1) and (2):

(1) A portion of the methacrylic resin composition is cut out with a circular saw and then prepared into a sample for observation by a $RuO_4$ (ruthenium acid)-stained ultrathin section method. The stained cross-sectional surface of the particles of the rubber polymer (B) is observed under a transmission electron microscope (TEM) and then photographed. The diameters of 10 typical particles in a high-magnification print are measured with a scale, and the average of the diameters of the particles is determined to determine the average particle size.

(2) An emulsion of the rubber polymer is sampled and diluted with water to a solid content of 500 ppm. The absorbance is measured at a wavelength of 550 nm using UV 1200V spectrophotometer (manufactured by Shimadzu Corp.). From this value, the average particle size is determined using a calibration curve prepared by similarly measuring absorbance for samples whose particle sizes have been measured from transmission electron microscope (TEM) photographs.

Both of these specific examples can provide substantially equivalent particle size measurement values.

In the methacrylic resin composition of the present embodiment, the difference between the refractive index of the methacrylic resin (A) and the refractive index of the rubber polymer (B) is preferably 0.015 or less, more preferably 0.012 or less, further preferably 0.01 or less, from the viewpoint of high transparency, particularly, the suppression of the temperature dependence of the transparency.

<Method for Producing Rubber Polymer (B)>

The method for producing the rubber polymer (B) is not limited and the polymerization methods known in the art such as bulk polymerization, solution polymerization, suspension polymerization, or emulsion polymerization can be applied. The rubber polymer (B) is particularly preferably obtained by emulsion polymerization.

In the case of forming the rubber polymer (B) from acrylic rubber particles having a three-layer structure, a monomer mixture for the innermost layer (b-i) is first added in the presence of an emulsifier and a polymerization initiator to complete polymerization. Next, a monomer mixture for the middle layer (b-ii) is added to the resulting product to complete polymerization. Subsequently, a monomer mixture for the outermost layer (b-iii) is added to the resulting product to complete polymerization. In this way, multilayer structure particles can be easily obtained as a latex.

The rubber polymer (B) can be recovered as a powder from the latex by a method known in the art such as salting out, spray drying, or freeze drying.

The average particle size of the rubber polymer (B) can be controlled within 0.04 to 1.0 μm by adjusting various polymerization conditions such as the amounts of the monomers added, the polymerization time, and the polymerization temperature for each layer.

<Content of Rubber Polymer (B)>

The content of the rubber polymer (B) in the methacrylic resin composition of the present embodiment is 26 to 70% by mass, preferably 28 to 70% by mass, more preferably 30 to 70% by mass, further preferably 31 to 68% by mass, still further preferably 31 to 65% by mass, even preferably 32 to 60% by mass, still even preferably 33 to 57% by mass, with respect to 100% by mass in total of the methacrylic resin (A) and the rubber polymer (B).

The methacrylic resin composition of the present embodiment containing the rubber polymer (B) at the content of 70% by mass or less has favorable balance between fluidity and heat resistance. The methacrylic resin composition containing the rubber polymer (B) at the content of 26% by mass or more has favorable impact resistance.

<Method for Measuring Content of Rubber Polymer (B) in Methacrylic Resin Composition>

An exemplary method for measuring the content of the rubber polymer (B) in the methacrylic resin composition of the present embodiment will be described below.

The content of the rubber polymer (B) can be determined, for example, by measuring the amount of an acetone-insoluble portion of the methacrylic resin composition.

First, the methacrylic resin composition is precisely weighed (mass (W1)).

This methacrylic resin composition is placed in a centrifuge tube and then dissolved by the addition of acetone to remove an acetone-soluble portion.

The solvent is vaporized in a vacuum dryer. After cooling, the residue, i.e., the acetone-insoluble portion, is weighed (mass (W2)).

The content (X) (% by mass) of the acetone-insoluble portion (the content of the rubber polymer (B)) is calculated according to the following expression:

$$\text{Content } (X) \text{ of the acetone-insoluble portion} = (W2/W1) \times 100 \text{ (\% by mass)}.$$

[Characteristics of Methacrylic Resin Composition]
(Weight-average Molecular Weight and Molecular Weight Distribution of Methacrylic Resin Composition)

The weight-average molecular weight and the molecular weight distribution of the methacrylic resin composition of the present embodiment will be described.

The methacrylic resin composition of the present embodiment has a weight-average molecular weight (Mw) of 40000 to 300000 measured by the gel permeation chromatography (GPC) of a component dissolved in tetrahydrofuran (THF).

The weight-average molecular weight is substantially the weight-average molecular weight of the methacrylic resin (A).

The methacrylic resin composition of the present embodiment having the weight-average molecular weight (Mw) of 40000 or larger has excellent mechanical strength and solvent resistance. The weight-average molecular weight is preferably 50000 or larger, more preferably 60000 or larger.

The methacrylic resin composition of the present embodiment having the weight-average molecular weight (Mw) of 300000 or smaller has favorable fluidity. The weight-average molecular weight is preferably 250000 or smaller, more preferably 200000 or smaller, further preferably 180000 or smaller.

The methacrylic resin composition having a weight-average molecular weight in the range mentioned above has favorable balance among fluidity, mechanical strength, and solvent resistance and maintains favorable molding processability.

The molecular weight distribution (Mw/Mn) of the methacrylic resin composition of the present embodiment is preferably 1.8 to 6.0, more preferably 2.0 to 5.5, further preferably 2.2 to 5.0.

The methacrylic resin composition having the molecular weight distribution of 1.8 or more and 6.0 or less has excellent balance between fluidity in a molding process and mechanical strength.

The weight-average molecular weight (Mw) and the number-average molecular weight (Mn) of the methacrylic resin composition can be measured by gel permeation chromatography (GPC) and can be specifically measured by a method described in [Examples] mentioned later.

Specifically, a calibration curve of weight-average molecular weights vs. elution times is prepared in advance using standard methacrylic resins that have a known weight-average molecular weight in a monodisperse system and are available as reagents, and an analytical gel column that elutes high-molecular-weight components first. Subsequently, the weight-average molecular weight (Mw) and the number-average molecular weight (Mn) of a predetermined methacrylic resin to be measured can be determined on the basis of the obtained calibration curve. From these values, the molecular weight distribution can be calculated.

The number-average molecular weight (Mn) refers to the average of molecular weights of individual simple molecules and is defined as the total weight of the system/the number of molecules in the system. The weight-average molecular weight (Mw) is defined as the average of molecular weights based on weight fractions.

The weight-average molecular weight and the molecular weight distribution of the methacrylic resin composition of the present embodiment can be controlled by adjusting the amounts of the monomers in a polymerization step, the types of additives such as a polymerization initiator or a chain transfer agent, the amounts of these additives added, and various polymerization conditions.
(Ratio (%) of Area of Molecular Weight Range of 15000 to 30000)

In the methacrylic resin composition of the present embodiment, the area of a molecular weight range of 15000 to 30000 in a differential molecular weight distribution curve obtained from the GPC elution curve is 10 to 70% in terms of a ratio to the total area of the differential molecular weight distribution curve obtained from the GPC elution curve.

The area of a molecular weight range of 15000 to 30000 is 10 to 70%, preferably 12 to 65%, more preferably 14 to 60%, further preferably 15 to 55%, still further preferably 15 to 50%, in terms of a ratio to the total area of the differential molecular weight distribution curve obtained from the GPC elution curve from the viewpoint of the fluidity of the methacrylic resin composition and the dispersibility of the rubber polymer (B).

In this context, the ratio (%) of the area of a molecular weight range of 15000 to 30000 refers to the proportion of the area of a molecular weight range of 15000 to 30000 when the total area of the differential molecular weight distribution curve obtained from the GPC elution curve is defined as 100%, and can be measured by a method described in [Examples] mentioned later.

The methacrylic resin composition of the present embodiment in which the ratio (%) of the area of a molecular weight range of 15000 to 30000 is 10% or more has favorable fluidity in molding. The methacrylic resin composition in which the ratio (%) of the area of a molecular weight range of 15000 to 30000 is 70% or less has favorable rubber dispersibility.

FIG. 1 shows an exemplary GPC elution curve on a GPC measurement graph.

In FIG. 1, the ordinate of the graph depicts RI (differential refractive index) detection intensity (mV), and the abscissa of the graph depicts elution time (min).

First, points A and B at which a GPC elution curve 1 intersects a baseline 2 automatically drawn by a measurement apparatus are set for the GPC elution curve obtained from elution time obtained in GPC measurement and detection intensity based on RI (differential refractive index detector).

The point A is a point at which the GPC elution curve 1 and the baseline 2 intersect each other at the initial stage of the elution time.

The point B is a point at which the GPC elution curve 1 and the baseline 2 intersect each other at the terminal stage of the elution time.

The amount of the diagonally shaded portion surrounded by the GPC elution curve between the point A and the point B and the line segment AB corresponds to an area in the GPC elution curve.

By use of a column that elutes high-molecular-weight components first, the high-molecular-weight components are observed at the initial stage of the elution time, while low-molecular-weight components are observed at the terminal stage of the elution time.

Figure 2:
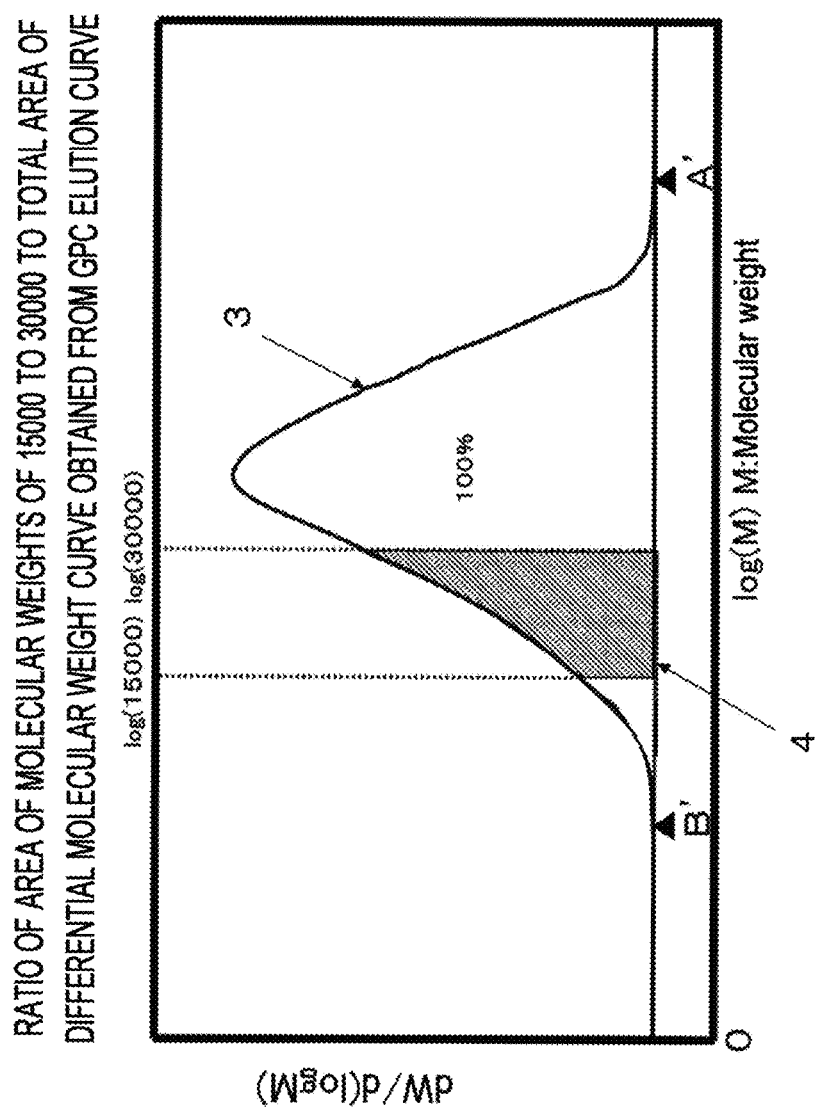
FIG. 2 shows a diagrammatic view of the ratio of the area of molecular weights of 15000 to 30000 to the total area in a differential molecular weight distribution curve obtained from the GPC elution curve.

FIG. 2 shows an exemplary ratio (%) of the area of molecular weights of 15000 to 30000 to the total area in the differential molecular weight distribution curve obtained from the GPC elution curve.

In FIG. 2, the ordinate of the graph depicts dW/d (log M), and the abscissa of the graph depicts log M (M: molecular weight). dW/d (log M) is a differential molecular weight distribution curve 3 obtained by normalizing the GPC elution curve measurement graph of FIG. 1, and means a graph reflecting the calibration curve by normalizing measured values in GPC measurement.

In this context, the point A of FIG. 1 corresponds to a point A' of FIG. 2, and the point B of FIG. 1 corresponds to a point B' of FIG. 2. The total area (100%) of the differential molecular weight distribution curve obtained from the GPC elution curve refers to an area surrounded by the differential molecular weight distribution curve 3 between the point A' and the point B' and the line segment A' B' in FIG. 2.

In this context, the ratio (%) of the area of molecular weights of 15000 to 30000 to the total area in the differential molecular weight distribution curve obtained from the GPC elution curve is an area represented by the diagonally shaded portion of FIG. 2.

For the methacrylic resin composition of the present embodiment, the ratio (%) of the area of molecular weights of 15000 to 30000 to the total area in the differential molecular weight distribution curve obtained from the GPC elution curve can be controlled within the numerical range mentioned above by adjusting the amounts of the monomers, the types of additives such as a polymerization initiator or a chain transfer agent, the amounts of these additives added, and various polymerization conditions, in a polymerization step for the methacrylic resin (A).

(Average Number per Field of View of Rubber Polymer Particles (Bα) Entirely Surrounded by Rubber Polymer (B))

When arbitrary 10 fields of view of the methacrylic resin composition of the present embodiment are observed under conditions involving a magnification of 50000 times under a transmission electron microscope (TEM), the methacrylic resin composition has a plurality of aggregates each constituted by a plurality of particles of the rubber polymer (B) having an average particle size of 0.04 to 1.0 μm. The plurality of aggregates include an aggregate in which 0 or more and 10 or less rubber polymer particles (Bα) entirely surrounded by other rubber polymer particles are present. In addition, the average number of the rubber polymer particles (Bα) is 0 or more and 10 or less per one of the 10 fields of view.

The "rubber polymer particle entirely surrounded by other rubber polymer particles" refers to a predetermined rubber polymer particle whose outer surface is in contact with a plurality of other rubber polymer particles and whose whole circumference is surrounded by these other rubber polymer particles in a two-dimensional observation image when a predetermined field of view is observed under the TEM.

This does not mean that the whole surface of the predetermined rubber polymer particle is in contact with other rubber polymer particles, and merely means that the predetermined rubber polymer particle surrounded by other rubber polymer particles is unable to come in contact with further rubber polymer particles.

Assuming three-dimensional surface, it is unnecessary that the whole surface of the predetermined rubber polymer particle should be covered by other rubber polymer particles.

Figures 3A, 3B, 3C:
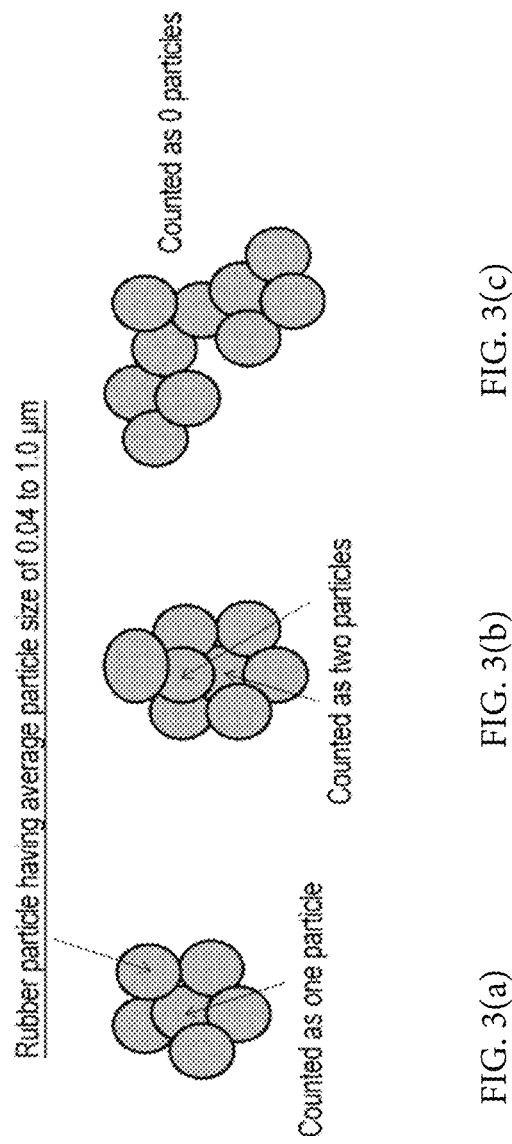
FIGS. 3(a) and 3(b) each schematically show a diagrammatic view of rubber polymer particles (Bα) entirely surrounded by other particles of the rubber polymer (B).
FIG. 3(c) shows the case where 0 rubber polymer particles (Bα) are present.

FIGS. 3(a) to 3(c) each schematically show a diagrammatic view of the rubber polymer particles (Bα) entirely surrounded by other particles of the rubber polymer (B). A method for calculating the number of the rubber polymer particles (Bα) per field of view will be described.

In FIG. 3(a), the aggregate shown is an aggregate in which one rubber polymer particle (Bα) entirely surrounded by other rubber polymer particles is present.

In FIG. 3(b), the aggregate shown is an aggregate in which two rubber polymer particles (Bα) entirely surrounded by other rubber polymer particles are present.

In FIG. 3(c), the aggregate shown is an aggregate in which 0 rubber polymer particles (Bα) entirely surrounded by other rubber polymer particles are present.

For example, when 11 aggregates shown in FIG. 3(a) are present per field of view, the average number of the rubber polymer particles (Bα) is 11 per field of view.

When 6 aggregates shown in FIG. 3(b) are present per field of view, the average number of the rubber polymer particles (Bα) is 6×2=12 per field of view.

When 3 aggregates shown in FIG. 3(a) and 3 aggregates shown in FIG. 3(b) are present per field of view, the average number of the rubber polymer particles (Bα) is 3+2×3=9 per field of view.

As shown in FIG. 3(c), the aggregate may have a structure in which particles of the rubber polymer (B) are chained without being entirely surrounded by other particles of the rubber polymer. In this aggregate, the number of the rubber polymer particles (Bα) is 0.

Methods conventionally known in the art can be used as a method for measuring the numbers of the rubber polymer particles (Bα) entirely surrounded by other particles of the rubber polymer (B) in arbitrary 10 fields of view of the methacrylic resin composition, and a method for calculating the average number thereof per field of view.

Preferred examples of the measurement methods include the following method:

A portion of the methacrylic resin composition is cut out with a circular saw and then prepared into a sample for observation by a RuO$_4$ (ruthenium acid)-stained ultrathin section method. The stained cross-sectional surface of the particles of the rubber polymer is observed under a transmission electron microscope (TEM) and then photographed.

The diameters of 10 typical rubber polymer particles photographed at a magnification of 50000 times are measured with a scale, and the average of the diameters of the rubber polymer particles is determined to determine the average particle size of the rubber polymer (B) in terms of a primary particle size.

As for criteria for determining this average particle size, arbitrary 10 fields of view are photographed at a magnification of 50000 times, and the numbers of the rubber polymer particles (Bα) entirely surrounded by other particles of the rubber polymer (B) in these 10 fields of view can be measured and then divided by the number of the fields of view to determine the average number of the rubber polymer particles (Bα) per field of view.

When the average number of the rubber polymer particles (Bα) is 10 or less per field of view, the resulting rubber polymer (B) has favorable dispersibility and can reduce variations in physical properties such as impact strength.

The average number of the rubber polymer particles (Bα) is preferably 8 or less, more preferably 7 or less, further preferably 6 or less, still further preferably 5 or less per field of view.

The average number of the rubber polymer particles (Bα) per field of view can be controlled by appropriately adjusting kneading conditions for producing the methacrylic resin composition by kneading a rubber polymer and a methacrylic resin as mentioned later, specifically, a starting material supply method, a set temperature, screw configuration, etc.

(Other Components that may be Mixed into Methacrylic Resin Composition)

The methacrylic resin composition of the present embodiment may contain other additives, in addition to the components (A) and (B) mentioned above, without impairing the object of the present invention.

The methacrylic resin composition of the present embodiment is preferably supplemented with, particularly, a heat stabilizer, an ultraviolet absorber, a mold release agent, and a flame retardant, etc.

<Heat Stabilizer>

Examples of the heat stabilizer include, but are not limited to, antioxidants such as hindered phenol antioxidants and phosphorus processing stabilizers. A hindered phenol antioxidant is preferred.

Examples of the heat stabilizer include, but are not limited to, pentaerythritol tetrakis[3-(3,5-di-tert-butyl-4-hydroxyphenyl)propionate, thiodiethylene bis[3-(3,5-di-tert-butyl-4-hydroxyphenyl)propionate, octadecyl-3-(3,5-di-tert-butyl-4-hydroxyphenyl)propionate, N,N'-hexane-1,6-diylbis[3-(3,5-di-tert-butyl-4-hydroxyphenylpropionamide, 3,3',3",5,5',5"-hexa-tert-butyl-a,a',a"-(mesitylene-2,4,6-triyl)tri-p-cresol, 4,6-bis(octylthiomethyl)-o-cresol, 4,6-bis(dodecylthiomethyl)-o-cresol, ethylene bis(oxyethylene)bis[3-(5-tert-butyl-4-hydroxy-m-tolyl)propionate, hexamethylene bis[3-(3,5-di-tert-butyl-4-hydroxyphenyl)propionate, 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylin)methyl]-1,3,5-triazine-2,4,6(1H,3H,5H)-trione, and 2,6-di-tert-butyl-4-(4,6-bis(octylthio)-1,3,5-triazin-2-ylamine)phenol. Pentaerythritol tetrakis[3-(3,5-di-tert-butyl-4-hydroxyphenyl)propionate is preferred.

Only one of these heat stabilizers may be used alone, or two or more thereof may be used in combination.

<Ultraviolet Absorber>

Examples of the ultraviolet absorber include, but are not limited to, benzotriazole compounds, benzotriazine compounds, benzoate compounds, benzophenone compounds, oxybenzophenone compounds, phenol compounds, oxazole compounds, malonic acid ester compounds, cyano acrylate compounds, lactone compounds, salicylic acid ester compounds, and benzoxazinone compounds. A benzotriazole compound or a benzotriazine compound is preferred.

Only one of these ultraviolet absorbers may be used alone, or two or more thereof may be used in combination.

In the case of adding the ultraviolet absorber, the vapor pressure (P) at 20° C. is preferably $1.0 \times 10^{-4}$ Pa or lower, more preferably $1.0 \times 10^{-6}$ Pa or lower, further preferably $1.0 \times 10^{-8}$ Pa or lower, from the viewpoint of molding processability.

Excellent molding processability means, for example, low adherence of the ultraviolet absorber to mold surface during injection molding, or low adherence of the ultraviolet absorber to a roll during film molding. The adherence of the ultraviolet absorber to a roll is unfavorable for use of the resulting molded article as an optical material because the ultraviolet absorber might adhere to, for example, the surface of the molded article and deteriorate its appearance or optical characteristics.

The melting point (Tm) of the ultraviolet absorber is preferably 80° C. or higher, more preferably 100° C. or higher, further preferably 130° C. or higher, still further preferably 160° C. or higher, from the viewpoint of heat resistance.

The rate of decrease in the mass of the ultraviolet absorber when the temperature is raised from 23° C. to 260° C. at a rate of 20° C./min is preferably 50% or less, more preferably 30% or less, further preferably 15% or less, still further preferably 10% or less, even preferably 5% or less, from the viewpoint of bleedout.

<Mold Release Agent>

Examples of the mold release agent include, but are not limited to, fatty acid amides, fatty acid alkyls, fatty acid glycerides, and aliphatic alcohols.

The fatty acid amides can usually be compounds having a structure in which a fatty acid having approximately 10 to 22 carbon atoms is dehydration-condensed with an ammonia or amino compound. Examples thereof include, but are not limited to: saturated fatty acid amides such as lauric acid amide, palmitic acid amide, stearic acid amide, and behenic acid amide; unsaturated fatty acid amides such as oleic acid amide and linoleic acid amide; and other amides such as ethylene bis(lauric acid amide), ethylene bis(palmitic acid amide), and ethylene bis(stearic acid amide). If necessary, two or more of these fatty acid amides may be used. Among them, stearic acid amide or ethylene bis(stearic acid amide) is preferred.

The fatty acid alkyls can usually be compounds having a structure in which a fatty acid having approximately 10 to 22 carbon atoms is dehydration-condensed with a monohydric aliphatic alcohol having approximately 1 to 10 carbon atoms. Examples thereof include, but are not limited to: saturated fatty acid alkyls such as methyl laurate, ethyl laurate, butyl laurate, octyl laurate, methyl palmitate, ethyl palmitate, butyl palmitate, octyl palmitate, methyl stearate, ethyl stearate, butyl stearate, octyl stearate, methyl behenate, ethyl behenate, butyl behenate, and octyl behenate; and unsaturated fatty acid alkyls such as methyl oleate, ethyl oleate, butyl oleate, octyl oleate, methyl linoleate, ethyl linoleate, butyl linoleate, and octyl linoleate. If necessary, two or more of these fatty acid alkyls may be used. Among them, alkyl stearate such as methyl stearate, ethyl stearate, butyl stearate, or octyl stearate is preferred, and methyl stearate is more preferred.

The fatty acid glycerides can usually be compounds having a structure in which a fatty acid having approximately 10 to 22 carbon atoms is dehydration-condensed with glycerin. Examples thereof include, but are not limited to, fatty acid monoglycerides, fatty acid diglycerides, and fatty acid triglycerides. Specific examples thereof include: saturated fatty acid glycerides such as lauric acid monoglyceride, lauric acid diglyceride, lauric acid triglyceride, palmitic acid monoglyceride, palmitic acid diglyceride, palmitic acid triglyceride, stearic acid monoglyceride, stearic acid diglyceride, stearic acid triglyceride, behenic acid monoglyceride, behenic acid diglyceride, and behenic acid triglyceride; and unsaturated fatty acid glycerides such as oleic acid monoglyceride, oleic acid diglyceride, oleic acid triglyceride, linoleic acid monoglyceride, linoleic acid diglyceride, and linoleic acid triglyceride. If necessary, two or more of these fatty acid glycerides may be used. Among them, stearic acid glyceride such as stearic acid monoglyceride, stearic acid diglyceride, or stearic acid triglyceride is preferred, and stearic acid monoglyceride is more preferred.

The aliphatic alcohols can usually be aliphatic alcohols each having 10 to 22 carbon atoms. The aliphatic alcohols may be monohydric alcohols or may be polyhydric alcohols. Specific examples of the aliphatic alcohols include, but are not limited to: saturated aliphatic alcohols such as lauryl alcohol, palmityl alcohol, stearyl alcohol, and behenyl alcohol; and unsaturated aliphatic alcohols such as oleyl alcohol and linoleyl alcohol. If necessary, two or more of these aliphatic alcohols may be used. Among them, stearyl alcohol is preferred. Only one of these mold release agents may be used alone, or two or more thereof may be used in combination.

<Flame Retardant>

Examples of the flame retardant include, but are not limited to, cyclic nitrogen compounds, phosphorus flame retardants, silicon flame retardants, polyhedral oligomeric silsesquioxane or partial cleavage products thereof, and silica flame retardants.

Only one of these flame retardants may be used alone, or two or more thereof may be used in combination.

<Additional Additives other than those Described above>

The methacrylic resin composition of the present embodiment can be further supplemented with various additives without impairing the effects of the present invention, from the viewpoint of imparting thereto various characteristics such as antistatic performance, rigidity, and dimensional stability.

Examples of these additional additives include, but are not limited to: plasticizers such as phthalic acid ester, fatty acid ester, trimellitic acid ester, phosphoric acid ester, and polyester plasticizers; antistatic agents such as polyether, polyether ester, and polyether ester amide antistatic agents, alkylsulfonates, and alkylbenzenesulfonates; stabilizers such as antioxidants and light stabilizers; and other additives such as flame retardant promoters, curing agents, curing accelerators, conductivity-imparting agents, stress releasers, crystallization accelerators, hydrolysis inhibitors, lubricants, impact resistance-imparting agents, slidability-improving agents, compatibilizers, nucleophiles, reinforcing agents, strengthening agents, flow adjusters, sensitizers, thickeners, antisettling agents, anti-sagging agents, fillers, antifoaming agents, coupling agents, rust preservatives, antibacterial and antifungal agents, antifoulants, and conductive polymers.

Only one of these additives may be used alone, or two or more thereof may be used in combination.

Also, the methacrylic resin composition may be supplemented with light-diffusing fine particles given below for the purpose of imparting thereto functions.

<Light-diffusing Fine Particles>

Examples of the light-diffusing fine particles include, but are not limited to: inorganic fine particles such as alumina, titanium oxide, calcium carbonate, barium sulfate, silicon dioxide, and glass beads; and organic fine particles such as cross-linked styrene beads, cross-linked MS beads, and cross-linked siloxane beads.

Other examples thereof include hollow cross-linked fine particles made of a highly transparent resin material such as a methacrylic resin, a polycarbonate resin, a MS resin, or a cyclic olefin resin, and hollow fine particles made of glass.

Inorganic fine particles are preferred, and alumina, titanium oxide, or the like is more preferred.

Only one type of these light-diffusing fine particles may be used alone, or two or more types thereof may be used in combination.

In this context, the refractive index of the light-diffusing fine particles is preferably 1.7 to 3.0, more preferably 1.7 to 2.5, further preferably 1.7 to 2.0.

The light-diffusing fine particles having the refractive index of 1.7 or more provides adequate light-scattering properties. The light-diffusing fine particles having the refractive index of 3.0 or less can practically sufficiently suppress light scattering near a light source when the methacrylic resin composition of the present embodiment is used, for example, as a component in a molded product equipped with the light source. As a result, uneven luminance and uneven outgoing light color can be effectively suppressed.

The refractive index refers to a value at a temperature of 20° C. based on D rays (589 nm).

Examples of the method for measuring the refractive index of the light-diffusing fine particles include a method which involves dipping the light-diffusing fine particles in a liquid capable of gradually changing its refractive index, observing the interface of the light-diffusing fine particles with the refractive index of the liquid changed, and measuring the refractive index of the liquid when the interface of the light-diffusing fine particles becomes obscure.

The refractive index of the liquid can be measured using an Abbe's refractometer or the like.

The average particle size of the light-diffusing fine particles dispersed in the methacrylic resin (A) is preferably 0.1 to 20 µm, more preferably 0.2 to 15 µm, further preferably 0.3 to 10 µm, still further preferably 0.4 to 5 µm. The average particle size of 20 µm or smaller is preferred because the resulting light-diffusing fine particles suppress light loss attributed to back reflection or the like and can efficiently diffuse incoming light to the lighting surface side, when the methacrylic resin composition of the present embodiment is used as a light diffuser panel for a display apparatus. The average particle size of 0.1 µm or larger is preferred because the resulting light-diffusing fine particles can diffuse outgoing light and can provide the desired surface emission luminance and light-diffusing properties.

The content of the light-diffusing fine particles in the methacrylic resin composition is preferably 0.0001 to 0.03 parts by mass, more preferably 0.0001 to 0.01 parts by mass, with respect to 100 parts by mass of the methacrylic resin composition from the viewpoint of the exertion of a light-diffusing effect and the uniform surface emission of the methacrylic resin composition used as a light diffuser panel for a display apparatus.

<Other Resins>

The methacrylic resin composition of the present embodiment may contain a resin conventionally known in the art, in addition to the components (A) and (B) mentioned above, without impairing the object of the present invention.

The resin used is not limited, and a curable resin or a thermoplastic resin conventionally known in the art is preferably used.

Examples of the thermoplastic resin include, but are not limited to, polypropylene resins, polyethylene resins, polystyrene resins, syndiotactic polystyrene resins, ABS resins (acrylonitrile-butadiene-styrene copolymers), methacrylic resins, AS resins (acrylonitrile-styrene copolymers), BAAS resins (butadiene-acrylonitrile-acrylonitrile rubber-styrene copolymers), MBS resins (methyl methacrylate-butadiene-styrene copolymers), AAS resins (acrylonitrile-acrylonitrile rubber-styrene copolymers), biodegradable resins, polycarbonate-ABS resin alloys, polyalkylene arylate resins (e.g., polybutylene terephthalate, polyethylene terephthalate, polypropylene terephthalate, polytrimethylene terephthalate, and polyethylene naphthalate), polyamide resins, polyphenylene ether resins, polyphenylene sulfide resins, and phenol resins.

Particularly, an AS resin or a BAAS resin is preferred for improving fluidity. An ABS resin or a MBS resin is preferred for improving impact resistance. A polyester resin is preferred for improving chemical resistance.

Also, a polyphenylene ether resin, a polyphenylene sulfide resin, a phenol resin, or the like can be expected to be effective for improving flame retardancy.

Examples of the curable resin include, but are not limited to, unsaturated polyester resins, vinyl ester resins, diallyl phthalate resins, epoxy resins, cyanate resins, xylene resins, triazine resins, urea resins, melamine resins, benzoguanamine resins, urethane resins, oxetane resins, ketone resins, alkyd resins, furan resins, styrylpyridine resins, silicon resins, and synthetic rubbers.

Only one of these resins may be used alone, or two or more of the resins may be used in combination.

[Method for Producing Methacrylic Resin Composition]

The method for producing the methacrylic resin composition of the present embodiment preferably include: melt-kneading a methacrylic resin (A1) having a weight-average molecular weight (Mw) of 40000 to 350000 with the rubber polymer (B) to obtain a mixture; and adding a methacrylic resin (A2) having a weight-average molecular weight (Mw) of 5000 to 40000 to the mixture.

The methacrylic resin (A1) and the methacrylic resin (A2) can each be produced by the aforementioned method for producing the methacrylic resin (A).

The weight-average molecular weights of the methacrylic resins (A1) and (A2) can be controlled within the ranges described above by adjusting the amounts of the monomers added and polymerization conditions.

An approach of mixing the methacrylic resin (A) with the rubber polymer (B) by dry blending in advance and collectively melt-kneading them tends to cause the poor dispersion of the rubber polymer (B).

In the case of collectively melt-kneading the starting materials, an extruder having L/D exceeding 35 is preferably used in the melt kneading from the viewpoint of enhancing the dispersibility of the rubber polymer (B).

Examples of the melt kneading method include kneading methods using a kneading machine such as an extruder, a heat roll, a kneader, a roller mixer, or a Bumbary mixer.

Among them, kneading using an extruder is preferred from the viewpoint of productivity.

The melt kneading method particularly preferably involves melt-kneading the methacrylic resin (A1) with the rubber polymer (B) in a top feeder using an extruder, subsequently supplying the methacrylic resin (A2) from a side feeder of the extruder, and melt-kneading the methacrylic resin (A2) with the mixture kneaded in the top feeder to obtain the methacrylic resin composition. In this operation, any of single-screw and twin-screw extruders may be used, and a twin-screw extruder is more preferably used from the viewpoint of the dispersibility of the rubber polymer (B).

The kneading temperature can follow the processing temperature of the methacrylic resin composition and, as a guideline, is in the range of 140 to 300° C., preferably in the range of 180 to 280° C.

A method conventionally known in the art can be used without limitations as a kneading method for mixing various additives or other resins into the methacrylic resin composition of the present embodiment.

[Molded Article]

The molded article of the present embodiment is obtained by molding the methacrylic resin composition of the present embodiment mentioned above.

A method known in the art such as injection molding, sheet molding, blow molding, injection blow molding, inflation molding, T-die molding, press molding, extrusion molding, foam molding, or film molding by casting can be applied to the method for producing the molded article. Alternatively, a secondary fabrication method such as air-pressure molding or vacuum molding may be used.

When the methacrylic resin composition of the present embodiment contains a curable resin as an additive, the components for producing the methacrylic resin composition are mixed without a solvent or with a solvent that permits uniform mixing as needed, followed by the removal of the solvent to obtain the methacrylic resin composition, which can then be poured into a mold, cured, then cooled, and taken out of the mold to obtain the molded article.

Alternatively, the methacrylic resin composition may be poured into a mold and cured by heat press.

The solvent for dissolving each component is not limited as long as the solvent allows the materials for the methacrylic resin composition to be uniformly mixed and its use does not impair the characteristics of the methacrylic resin composition of the present embodiment. Examples of the solvent include, but are not limited to, toluene, xylene, acetone, methyl ethyl ketone, methyl butyl ketone, diethyl ketone, cyclopentanone, cyclohexanone, dimethylformamide, methylcellosolve, methanol, ethanol, n-propanol, isopropanol, n-butanol, n-pentanol, n-hexanol, cyclohexanol, n-hexane, and n-pentane.

The curing method differs depending on the curing agent used and is not limited.

Examples thereof include thermal curing, photocuring, UV curing, curing under pressure, and curing by moisture.

The order in which the components are mixed is not limited as long as the effects of the present invention can be attained.

[Purpose]

The methacrylic resin composition or the molded article of the present embodiment can be used for furniture, household goods, storage or stockpile goods, construction materials for walls, roofs, etc., toys or playground equipment, hobby purposes such as pachinko boards, medical or welfare products, office automation equipment, audio visible equipment, cells or electrical equipment, lighting equipment, ships, body parts for aircraft structures, and parts for vehicles and can be particularly preferably used in parts for vehicles, optical components, electrical or electronical components, and sundry goods.

The methacrylic resin composition or the molded article of the present embodiment is particularly suitable for exterior parts required to have transparency and impact resistance, among the parts for vehicles. Examples thereof include, but are not limited to, bumpers, front grilles, headlight covers, rear light covers, peripheral components for bodies (visors, etc.), and peripheral components for tires.

Examples of the optical components include, but are not limited to, various lenses, touch panels, and transparent substrates for use in solar cells. In addition, the methacrylic resin composition or the molded article of the present embodiment can also be used for, for example, waveguides, optical fibers, covering materials for optical fibers, LED lenses or lens covers, and covers for EL illumination or the like in the fields of optical communications systems, optical switching systems, and optical measurement systems.

Examples of the electrical or electronical components include, but are not limited to: display apparatuses for personal computers, game consoles, televisions, car navigation systems, and electronic papers; drives or readers for printers, copiers, scanners, facsimiles, electronic notepads or PDAs, electronic desk calculators, electronic dictionaries, cameras, video cameras, mobile phones, battery packs, and recording media; and other components such as mice, numeric keypads, CD players, MD players, and portable radios or audio players. Examples thereof particularly include aesthetic components for cabinets of televisions, personal computers, car navigation systems, electronic papers, etc.

Examples of the sundry goods include, but are not limited to, water towers, wardrobe cases, various storage cases, and pachinko boards.

Examples of the medical purposes include covers or units for various instruments, and kits for examination.

The molded article containing the methacrylic resin composition of the present embodiment can also be subjected to, for example, surface functionalizing treatment such as anti-reflection treatment, transparent conductive treatment, electromagnetic wave shielding treatment, or gas barrier treatment.

The methacrylic resin composition of the present embodiment has high fluidity and mechanical strength. Therefore, the methacrylic resin composition or the molded article of the present embodiment can be preferably used for various thin long components having a long side of 100 mm or larger and a thickness of 3 mm or smaller.

EXAMPLES

Hereinafter, the present invention will be described with reference to specific Examples and Comparative Examples. However, the present invention is not intended to be limited by Examples mentioned later.

[Starting Materials Used in Examples and Comparative Examples]

Methyl methacrylate (MMA): manufactured by Asahi Kasei Chemicals Corp. (supplemented with 2.5 ppm of a polymerization inhibitor 2,4-di-methyl-6-tert-butylphenol manufactured by CBC Co., Ltd.)

Methyl acrylate (MA): manufactured by Mitsubishi Chemical Corp. (supplemented with 14 ppm of a polymerization inhibitor 4-methoxyphenol manufactured by Kawaguchi Chemical Industry Co., Ltd.)

Ethyl acrylate (EA): manufactured by Mitsubishi Chemical Corp.

n-Octylmercaptan: manufactured by Arkema

2-Ethylhexyl thioglycolate: manufactured by Arkema

Lauroyl peroxide: manufactured by NOF Corp.

Calcium phosphate: manufactured by Nippon Chemical Industrial Co., Ltd., used as a suspending agent Calcium carbonate: manufactured by Shiraishi Kogyo Kaisha, Ltd., used as a suspending agent Sodium lauryl sulfate: manufactured by Wako Pure Chemical Industries, Ltd., used as a suspension aid

[Measurement Methods]

(I. Compositional Analysis of Methacrylic Resin, and Molecular Weight Measurement of Methacrylic Resin Composition)

<1. Compositional Analysis of Methacrylic Resin (A)>

The compositional analysis of the methacrylic resin was conducted by pyrolysis gas chromatography and mass spectrometry.

Pyrolysis apparatus: Py-2020D manufactured by Frontier Laboratories Ltd.

Column: DB-1 (length: 30 m, inside diameter: 0.25 mm, liquid phase thickness: 0.25 μm)

Column temperature program: keep 40° C. for 5 min, then heat to 320° C. at a rate of 50° C./min, and keep 320° C. for 4.4 min Pyrolytic furnace temperature: 550° C.

Column inlet temperature: 320° C.

Gas chromatography: GC6890 manufactured by Agilent Technologies, Inc.

Carrier: pure nitrogen, flow rate: 1.0 mL/min

Injection method: split method (split ratio: 1/200)

Detector: mass spectrometer Automass Sun manufactured by JEOL Ltd.

Detection method: electron-impact ionization method (ion source temperature: 240° C., interface temperature: 320° C.)

Sample: 10 μL of a solution of 0.1 g of the methacrylic resin in 10 cc of chloroform The sample was collected into a platinum sample cup for the pyrolysis apparatus and vacuum-dried at 150° C. for 2 hours. Then, the sample cup was placed in a pyrolytic furnace where the compositional analysis of the sample was conducted under the conditions described above.

The compositional ratio of the methacrylic resin was determined on the basis of the peak areas of methyl methacrylate and methyl acrylate in total ion chromatography (TIC) and a calibration curve of the following standard samples.

Preparation of standard samples for calibration curve: 0.25% by mass of lauroyl peroxide and 0.25% by mass of n-octylmercaptan were added to 50 g each of a total of 5 solutions containing methyl methacrylate and methyl acrylate at a ratio of (methyl methacrylate/methyl acrylate)= (100% by mass/0% by mass), (98% by mass/2% by mass), (94% by mass/6% by mass), (90% by mass/10% by mass), or (80% by mass/20% by mass). Each of these mixed solutions was placed in a 100 mL glass ampoule vial. The air in the glass ampoule vial was purged with nitrogen and then sealed to prepare a glass ampoule.

The glass ampoule was placed in a water bath of 80° C. for 3 hours and then in an oven of 150° C. for 2 hours.

After cooling to room temperature, the methacrylic resin contained therein was taken out by breaking the glass and subjected to compositional analysis.

A graph of (the area of the methyl acrylate)/(the area of the methyl methacrylate+the area of the methyl acrylate), and the charging ratio of the methyl acrylate obtained by the measurement of the standard samples for a calibration curve was used as the calibration curve.

When ethyl acrylate was used as a starting material for the methacrylic resin, the compositional ratio was also analyzed in the same way as in use of the methyl acrylate mentioned above as a starting material.

<2. Methods for Measuring Weight-average Molecular Weight (Mw) of Methacrylic Resin Composition and Ratio of Area of Molecular Weight Range of 15000 to 30000 in GPC Elution Curve>

The weight-average molecular weight (Mw) of the methacrylic resin composition and the ratio of the area of a molecular weight range of 15000 to 30000 were measured using the following apparatus and conditions:

Measurement apparatus: gel permeation chromatography (HLC-8320GPC) manufactured by Tosoh Corp.

Column: 1 column of TSKgel Super H2500, 2 columns of TSKgel Super HM-M, and 1 column of TSK guard column Super H-H connected in series (these columns elute high-molecular-weight components first and elute low-molecular-weight components later.)

Detector: RI (differential refractive index) detector

Detection sensitivity: 3.0 mV/min

Column temperature: 40° C.

Sample: 10 mL of a solution of 0.02 g of the methacrylic resin in tetrahydrofuran Injection volume: 10 μL Developing solvent: tetrahydrofuran, flow rate: 0.6 mL/min Ten polymethyl methacrylates (given below) each having a known peak molecular weight in a monodisperse system and differing in molecular weight (Polymethyl methacrylate Calibration Kit PL2020-0101 M-M-10) were used as standard samples for a calibration curve.

Since the polymethyl methacrylates used as standard samples for a calibration curve each exhibit a single peak, their peak molecular weights were indicated by (Mp) and distinguished from the term "peak top molecular weight" involving a plurality of peaks.

| | Peak molecular weight (Mp) |
|---|---|
| Standard sample 1 | 1,916,000 |
| Standard sample 2 | 625,500 |
| Standard sample 3 | 298,900 |
| Standard sample 4 | 138,600 |
| Standard sample 5 | 60,150 |
| Standard sample 6 | 27,600 |
| Standard sample 7 | 10,290 |
| Standard sample 8 | 5,000 |
| Standard sample 9 | 2,810 |
| Standard sample 10 | 850 |

The RI detection intensity was measured for the elution time of the methacrylic resin composition under the conditions described above.

A differential molecular weight distribution curve was prepared using an analysis program on the basis of the area of the GPC elution curve and a calibration curve of third-order approximation to determine the weight-average molecular weight (Mw) of the methacrylic resin composition and the ratio (%) of the area of a molecular weight range of 15000 to 30000.

(II. Measurement of Average Particle Size of Rubber Polymer (B), the Number of Rubber Polymer Particles (Bα) Entirely Surrounded by other Particles of Rubber Polymer (B), and Acetone-insoluble Portion)

<(1) Average Particle Size Measurement of Rubber Polymer (B)>

An emulsion of the rubber polymer was sampled and diluted with water to a solid content of 500 ppm. The absorbance was measured at a wavelength of 550 nm using UV 1200V spectrophotometer (manufactured by Shimadzu Corp.).

From this value, the average particle size of the rubber polymer (B) was determined using a calibration curve prepared by similarly measuring absorbance for samples whose particle sizes had been measured from transmission electron microscope photographs.

<(2) Measurement of the Number of Rubber Polymer Particles (Bα) Entirely Surrounded by other Particles of Rubber Polymer Contained in Methacrylic Resin Composition>

A portion of the methacrylic resin composition was cut out with a circular saw and then prepared into a sample for observation by a $RuO_4$ (ruthenium acid)-stained ultrathin section method.

The stained cross-sectional surface of the rubber particles was observed under a transmission electron microscope (TEM) model HT7700 manufactured by Hitachi, Ltd., and then photographed.

The diameters of 10 typical aggregate-constituting rubber polymer particles photographed at a magnification of 50000 times were measured with a scale, and the average of the diameters of the rubber polymer particles was determined to determine the average particle size of the rubber polymer (B) in terms of a primary particle size.

Then, arbitrary 10 fields of view of the methacrylic resin composition were observed and photographed at a magnification of 50000 times. In aggregates containing particles of the rubber polymer (B) having the predetermined average particle size, the average number of the rubber polymer particles (Bα) entirely surrounded by other particles of the rubber polymer (B) was determined per field of view.

<(3) Measurement of Acetone-insoluble Portion>

Pellets of the methacrylic resin composition were dried overnight (approximately 80° C., approximately 12 hours or longer).

Then, approximately 1.0 g thereof was precisely weighed (W1) to obtain a sample, which was then placed in a centrifuge tube (metal tube).

Then, 20 mL of acetone was added thereto, and the tube was left standing for approximately 1 day and then shaken for 2 hours in a shaker.

Next, the tube was centrifuged for 1 hour using a vacuum high-speed refrigerated centrifuge model CR26H manufactured by Hitachi Koki Co., Ltd. under conditions set to 5° C. and 24000 rpm.

After the shaking, the supernatant was removed by decantation. Then, 20 mL of fresh acetone was added thereto, and the tube was shaken at room temperature for 1 hour.

After the shaking, the tube was centrifuged for 1 hour with conditions set to 5° C. and 24000 rpm.

This operation was repeated (a total of three runs) under the same conditions in the same way as above.

The supernatant was removed by decantation, and the residue was dried in air overnight.

A vacuum dryer was set to 100° C., followed by overnight (approximately 12 hours or longer) vacuum drying. Then, the sample was taken out and cooled to room temperature in a desiccator. Then, the mass of the residue was weighed (W2).

The content of the acetone-insoluble portion (% by mass) was calculated (X) according to the following expression:

Content of (X) the acetone-insoluble portion=
[(W2)/(W1)]×100 (% by mass)

In this way, the content of the rubber polymer in the methacrylic resin composition was calculated.

(III. Measurement of Physical Properties)

<1. Evaluation of Molding Processability>

A test was conducted such that relative fluidity was determined on the basis of the distance traveled by the methacrylic resin compositions of Examples and Comparative Examples mentioned later flowing in a spiral cavity having a constant cross-sectional area.

Injection molding machine: EC-100SX manufactured by Toshiba Machine Co., Ltd.

Mold for measurement: a mold in which a groove having a depth of 2 mm and a width of 12.7 mm was dug on the surface in an Archimedes spiral shape starting at the central portion on the surface.

(Injection Conditions)
Set temperature: 250° C.
Mold temperature: 60° C.
Injection pressure: 75 MPa
Injection time: 20 sec Each resin composition was injected to the central portion on the mold surface under the conditions described above.

40 seconds after the completion of injection, the spiral molded article was taken out, and the length of its spiral portion was measured. This value was used as an index for fluidity evaluation.

<2. Measurement of Vicat Softening Temperature>

For the evaluation of heat resistance, the Vicat softening temperature (VST) was measured for the methacrylic resin compositions of Examples and Comparative Examples mentioned later according to ISO 306 B50 using a heat distortion tester (HDT) (manufactured by Toyo Seiki Seisaku-Sho, Ltd.) and 4 mm thick molded articles.

<3. Transparency Evaluation>

For the evaluation of transparency, the haze (%) was measured under a temperature condition of 23° C. using 3 mm thick molded articles molded from the methacrylic resin compositions of Examples and Comparative Examples mentioned later and model NDH2000 manufactured by Nippon Denshoku Industries Co., Ltd.

<4. Evaluation of Charpy Impact Strength (without Notches) and Variations in Impact Strength>

For the evaluation of impact resistance, the Charpy impact strength (without notches) of the methacrylic resin compositions of Examples and Comparative Examples mentioned later was measured according to ISO179/1eU using a Charpy impact tester (manufactured by Toyo Seiki Seisaku-Sho, Ltd.).

For the evaluation of variations in impact strength, the average Charpy impact strength of ten 80 mm×10 mm×4 mm molded products was calculated and evaluated under the following criteria ○ to x:

○: the number of molded products having a value of ±30% with respect to the average was 2 or less Δ: the number of molded products having a value of ±30% with respect to the average was 3 or 4

X: the number of molded products having a value of ±30% with respect to the average was 5 or more <5. Evaluation of Color>

For the evaluation of color, the methacrylic resin compositions of Examples and Comparative Examples mentioned later were injection-molded into 60 mm×30 mm×3 mmt plates, and the difference in yellowness index (ΔYI) was measured.

Difference in yellowness index ΔYI=YI−YI0

YI: yellowness index of the molded product

YI0: yellowness index of air

In the ΔYI measurement, the value in the 60-mm direction (length through which the measurement light passed=60 mm) of each plate was measured using an apparatus ASA-I manufactured by Nippon Denshoku Industries Co., Ltd.

ΔYI represents the degree of yellowness of the molded article. A smaller value of this ΔYI means that the molded article is less stained and has better color.

Production Examples of Methacrylic Resin (A)

Production Example 1 (A-1)

A container having a stirrer was charged with 2 kg of ion-exchanged water, 65 g of calcium phosphate, 39 g of calcium carbonate, and 0.39 g of sodium lauryl sulfate to obtain a mixed solution (a).

Subsequently, a 60 L reactor was charged with 26 kg of ion-exchanged water, then heated to 80° C., and charged with the mixed solution (a), 21.2 kg of methyl methacrylate, 0.43 kg of methyl acrylate, 27 g of lauroyl peroxide, and 62 g of n-octylmercaptan.

Then, suspension polymerization was carried out while the temperature was kept at approximately 80° C. After observation of an exothermic peak, the reaction mixture was heated to 92° C. at a rate of 1° C./min and aged for 60 minutes to substantially terminate the polymerization reaction.

After subsequent cooling to 50° C., 20% by mass of sulfuric acid for dissolving the suspending agent was added thereto. The resulting polymerization reaction solution was sifted through a 1.68 mm mesh sieve to remove aggregates. The obtained polymer beads were subjected to washing, dewatering, and drying procedures to obtain fine polymer particles.

The obtained fine polymer particles (methacrylic resin (A-1)) had a weight-average molecular weight (Mw) of 104000 and a molecular weight distribution (Mw/Mn) of 1.8.

Its structural units were MMA/MA=98.0/2.0% by mass.

Production Example 2 (A-2)

A container having a stirrer was charged with 2 kg of water, 65 g of calcium phosphate, 40 g of calcium carbonate, and 0.40 g of sodium lauryl sulfate to obtain a mixed solution (b).

Subsequently, a 60 L reactor was charged with 25 kg of water, then heated to 80° C., and charged with the mixed solution (b), 21.2 kg of methyl methacrylate, 0.25 kg of methyl acrylate, 110 g of lauroyl peroxide, and 380 g of 2-ethylhexyl thioglycolate.

Then, suspension polymerization was carried out while the temperature was kept at approximately 80° C. After observation of an exothermic peak, the reaction mixture was heated to 92° C. at a rate of 1° C./min and aged for 60 minutes to substantially terminate the polymerization reaction.

After subsequent cooling to 50° C., 20% by mass of sulfuric acid for dissolving the suspending agent was added thereto.

The resulting polymerization reaction solution was sifted through a 1.68 mm mesh sieve to remove aggregates. The obtained polymer beads were subjected to washing, dewatering, and drying procedures to obtain fine polymer particles.

The obtained fine polymer particles (methacrylic resin (A-2)) had a weight-average molecular weight (Mw) of 25000 and a molecular weight distribution (Mw/Mn) of 1.8.

Its structural units were MMA/MA=99/1% by mass.

Production Example 3 (A-3)

A container having a stirrer was charged with 2 kg of water, 65 g of calcium phosphate, 40 g of calcium carbonate, and 0.40 g of sodium lauryl sulfate to obtain a mixed solution (c).

Subsequently, a 60 L reactor was charged with 25 kg of water, then heated to 80° C., and charged with the mixed solution (c), 21.5 kg of methyl methacrylate, 110 g of lauroyl peroxide, and 430 g of 2-ethylhexyl thioglycolate.

Then, suspension polymerization was carried out while the temperature was kept at approximately 75° C. After observation of an exothermic peak, the reaction mixture was heated to 92° C. at a rate of 1° C./min and aged for 60 minutes to substantially terminate the polymerization reaction.

After subsequent cooling to 50° C., 20% by mass of sulfuric acid for dissolving the suspending agent was added thereto.

The resulting polymerization reaction solution was sifted through a 1.68 mm mesh sieve to remove aggregates. The obtained polymer beads were subjected to washing, dewatering, and drying procedures to obtain fine polymer particles.

The obtained fine polymer particles (methacrylic resin (A-3)) had a weight-average molecular weight (Mw) of 22000 and a molecular weight distribution (Mw/Mn) of 1.8.

Its structural units were MMA=100% by mass.

Production Example 4 (A-4)

A container having a stirrer was charged with 2 kg of water, 65 g of calcium phosphate, 40 g of calcium carbonate, and 0.40 g of sodium lauryl sulfate to obtain a mixed solution (d).

Subsequently, a 60 L reactor was charged with 25 kg of water, then heated to 80° C., and charged with the mixed solution (d), 21.1 kg of methyl methacrylate, 0.4 kg of ethyl acrylate, 40 g of lauroyl peroxide, and 80 g of n-octylmercaptan.

Then, suspension polymerization was carried out while the temperature was kept at approximately 80° C. After observation of an exothermic peak, the reaction mixture was heated to 92° C. at a rate of 1° C./min and aged for 60 minutes to substantially terminate the polymerization reaction.

After subsequent cooling to 50° C., 20% by mass of sulfuric acid for dissolving the suspending agent was added thereto.

The resulting polymerization reaction solution was sifted through a 1.68 mm mesh sieve to remove aggregates. The obtained polymer beads were subjected to washing, dewatering, and drying procedures to obtain fine polymer particles.

The obtained fine polymer particles (methacrylic resin (A-4)) had a weight-average molecular weight (Mw) of 71000 and a molecular weight distribution (Mw/Mn) of 1.8.

Its structural units were MMA/EA=98.2/1.8% by mass.

Production Example 5 (A-5)

A container having a stirrer was charged with 2 kg of ion-exchanged water, 65 g of calcium phosphate, 39 g of calcium carbonate, and 0.39 g of sodium lauryl sulfate to obtain a mixed solution (e).

Subsequently, a 60 L reactor was charged with 26 kg of ion-exchanged water, then heated to 80° C., and charged with the mixed solution (e), 17.9 kg of methyl methacrylate, 3.2 kg of methyl acrylate, 25 g of lauroyl peroxide, and 24 g of n-octylmercaptan.

Then, suspension polymerization was carried out while the temperature was kept at approximately 80° C. After observation of an exothermic peak, the reaction mixture was heated to 92° C. at a rate of 1° C./min and aged for 60 minutes to substantially terminate the polymerization reaction.

After subsequent cooling to 50° C., 20% by mass of sulfuric acid for dissolving the suspending agent was added thereto. The resulting polymerization reaction solution was sifted through a 1.68 mm mesh sieve to remove aggregates. The obtained polymer beads were subjected to washing, dewatering, and drying procedures to obtain fine polymer particles.

The obtained fine polymer particles (methacrylic resin (A-5)) had a weight-average molecular weight (Mw) of 198000 and a molecular weight distribution (Mw/Mn) of 1.8.

Its structural units were MMA/MA=84.9/15.1% by mass.

Production Example 6 (A-6)

A container having a stirrer was charged with 2 kg of water, 65 g of calcium phosphate, 39 g of calcium carbonate, and 0.39 g of sodium lauryl sulfate to obtain a mixed solution (f).

Subsequently, a 60 L reactor was charged with 26 kg of water, then heated to 80° C., and charged with the mixed solution (f), 5.75 kg of methyl methacrylate, 59.31 g of lauroyl peroxide, and 122.06 g of 2-ethylhexyl thioglycolate as starting materials for producing a polymer (I).

Then, suspension polymerization was carried out while the temperature was kept at approximately 80° C. An exothermic peak was observed 65 minutes after addition of the starting materials for the polymer (I).

Then, the temperature was kept at 80° C. for 30 minutes. Then, a reactor was charged with 17.306 kg of methyl methacrylate, 445 g of methyl acrylate, 14.23 g of lauroyl peroxide, and 28.11 g of n-octylmercaptan for producing a polymer (II). Subsequently, suspension polymerization was carried out while the temperature was kept at approximately 80° C. An exothermic peak was observed 130 minutes after addition of the starting materials for the polymer (II).

Then, the reaction mixture was heated to approximately 92° C. at a rate of 1° C./min and then aged for 60 minutes to substantially terminate the polymerization reaction.

After subsequent cooling to 50° C., 20% by mass of sulfuric acid for dissolving the suspending agent was added thereto.

The resulting polymerization reaction solution was sifted through a 1.68 mm mesh sieve to remove aggregates. The obtained polymer beads were subjected to washing, dewatering, and drying procedures to obtain fine polymer particles.

The obtained fine polymer particles (methacrylic resin (A-6)) had a weight-average molecular weight (Mw) of 118000 and a molecular weight distribution (Mw/Mn) of 3.3.

Its structural units were MMA/MA=98.1/1.9% by mass.

Production Example 7 (A-7)

A container having a stirrer was charged with 2 kg of ion-exchanged water, 65 g of calcium phosphate, 39 g of calcium carbonate, and 0.39 g of sodium lauryl sulfate to obtain a mixed solution (g).

Subsequently, a 60 L reactor was charged with 26 kg of ion-exchanged water, then heated to 80° C., and charged with the mixed solution (g), 20.2 kg of methyl methacrylate, 3.0 kg of methyl acrylate, 60 g of lauroyl peroxide, and 65 g of n-octylmercaptan.

Then, suspension polymerization was carried out while the temperature was kept at approximately 75° C. After observation of an exothermic peak, the reaction mixture was heated to 92° C. at a rate of 1° C./min and aged for 60 minutes to substantially terminate the polymerization reaction.

After subsequent cooling to 50° C., 20% by mass of sulfuric acid for dissolving the suspending agent was added thereto. The resulting polymerization reaction solution was sifted through a 1.68 mm mesh sieve to remove aggregates. The obtained polymer beads were subjected to washing, dewatering, and drying procedures to obtain fine polymer particles.

The obtained fine polymer particles (methacrylic resin (A-7)) had a weight-average molecular weight (Mw) of 95000 and a molecular weight distribution (Mw/Mn) of 1.9.

Its structural units were MMA/MA=87.1/12.9% by mass.

Production Example 8 (A-8)

A container having a stirrer was charged with 2 kg of water, 65 g of calcium phosphate, 40 g of calcium carbonate, and 0.40 g of sodium lauryl sulfate to obtain a mixed solution (h).

Subsequently, a 60 L reactor was charged with 26 kg of water, then heated to 80° C., and charged with the mixed solution (h), 21.4 kg of methyl methacrylate, 0.1 kg of methyl acrylate, 110 g of lauroyl peroxide, and 1.0 kg of n-octylmercaptan.

Then, suspension polymerization was carried out while the temperature was kept at approximately 80° C. After observation of an exothermic peak, the reaction mixture was heated to 92° C. at a rate of 1° C./min and aged for 60 minutes to substantially terminate the polymerization reaction.

After subsequent cooling to 50° C., 20% by mass of sulfuric acid for dissolving the suspending agent was added thereto. The resulting polymerization reaction solution was sifted through a 1.68 mm mesh sieve to remove aggregates. The obtained polymer beads were subjected to washing, dewatering, and drying procedures to obtain fine polymer particles.

The obtained fine polymer particles (methacrylic resin (A-8)) had a weight-average molecular weight (Mw) of 11000 and a molecular weight distribution (Mw/Mn) of 2.1. Its structural units were MMA/MA=99.6/0.4% by mass.

Production Examples of Rubber Polymer (B)

Production Example of Rubber Polymer (B-1)

A 10 L reactor with a reflux condenser was charged with 4600 mL of ion-exchanged water and 24 g of sodium dioctyl sulfosuccinate as an emulsifier and heated to 80° C. in a nitrogen atmosphere with stirring at a rotation of 250 rpm to achieve a state in which the influence of oxygen was virtually absent.

Subsequently, 1.3 g of Rongalite reducing agent was added to the reactor as a reducing agent and uniformly dissolved.

For the first layer, a monomer mixture (II-1) containing 190 g of methyl methacrylate, 2.5 g of butyl acrylate, 0.2 g of allyl methacrylate, and 0.2 g of diisopropylbenzene hydroperoxide was added to the reactor, followed by polymerization at 80° C. The polymerization reaction completed in approximately 15 minutes.

For the second layer, a monomer mixture (II-2) containing 1360 g of butyl acrylate, 320 g of styrene, 40 g of polyethylene glycol diacrylate (molecular weight: 200), 7.0 g of allyl methacrylate, 1.6 g of diisopropylbenzene hydroperoxide, and 1.0 g of Rongalite reducing agent was added dropwise to the reactor over 90 minutes, followed by polymerization. The polymerization reaction completed in 40 minutes after the completion of dropwise addition.

As the first stage for the third layer, a monomer mixture (II-3) containing 190 g of methyl methacrylate, 2.3 g of butyl acrylate, and 0.2 g of diisopropylbenzene hydroperoxide was added dropwise to the reactor over 5 minutes, followed by polymerization. The polymerization reaction of this stage completed in approximately 15 minutes after the completion of dropwise addition.

Finally, as the second sage for the third layer, a monomer mixture (II-4) containing 380 g of methyl methacrylate, 4.6 g of methyl methacrylate, 0.4 g of diisopropylbenzene hydroperoxide, and 1.2 g of n-octylmercaptan was added to the reactor over 10 minutes. The polymerization reaction of this stage completed in approximately 15 minutes.

Then, the temperature was raised to 95° C. and kept for 1 hour to obtain a polymer emulsion. The obtained polymer emulsion (latex) was added into a 0.5% aqueous aluminum chloride solution to aggregate the polymer particles, which were then washed with hot water five times.

Then, a rubber polymer (B-1) was obtained by drying.

The obtained rubber polymer (B-1) had an average particle size of 0.1 μm.

Production Example of Rubber Polymer (B-2)

A 10 L reactor with a reflux condenser was charged with 6868 mL of ion-exchanged water and 13.7 g of sodium dihexyl sulfosuccinate and heated to 75° C. in a nitrogen atmosphere with stirring at a rotation of 250 rpm to achieve a state in which the influence of oxygen was virtually absent.

222 g of a mixture (I-1) containing 907 g of methyl methacrylate, 33 g of butyl acrylate, 0.28 g of 2-(2'-hydroxy-5'-methylphenyl)benzotriazole, and 0.93 g of allyl methacrylate was collectively added to the reactor, and 0.22 g of ammonium persulfate was added thereto 5 minutes later.

The remaining portion (719 g) of the mixture (I-1) was continuously added to the reactor over 20 minutes from 40 minutes thereafter, and the reaction mixture was further kept for 60 minutes after the completion of addition.

After subsequent addition of 1.01 g of ammonium persulfate, a mixture (I-2) containing 1067 g of butyl acrylate, 219 g of styrene, 0.39 g of 2-(2'-hydroxy-5'-methylphenyl) benzotriazole, and 27.3 g of allyl methacrylate was continuously added to the reactor over 140 minutes, and the reaction mixture was further kept for 180 minutes after the completion of addition.

After subsequent addition of 0.30 g of ammonium persulfate, a mixture (I-3) containing 730 g of methyl methacrylate, 26.5 g of butyl acrylate, 0.22 g of 2-(2'-hydroxy-5'-methylphenyl)benzotriazole, and 0.76 g of n-octylmercaptan was continuously added to the reactor over 40 minutes. After the completion of addition, the reaction mixture was heated to 95° C. and kept for 30 minutes to obtain a polymer emulsion.

The obtained polymer emulsion (latex) was added into a solution containing 3% by mass of sodium sulfate in hot water for salting-out and aggregation. Subsequently, dewatering and washing procedures were repeated 5 times, followed by drying to obtain a rubber polymer (B-2).

The obtained rubber polymer (B-2) had an average particle size of 0.23 μm.

Example 1

A twin-screw extruder (φ30 mm, L/D=35, 150 rpm) temperature-set to 210 to 260° C. was used. The methacrylic resin (A-1) and the rubber polymer (B-1) were first supplied from the top feeder of the twin-screw extruder according to the ratio (% by mass) shown in Table 1, and melt-kneaded. Subsequently, the methacrylic resin (A-2) was supplied from the side feeder of the extruder and melt-kneaded to obtain a methacrylic resin composition.

Examples 2 to 6

The same twin-screw extruder as in Example 1 was used. The methacrylic resin (A-1) and each rubber polymer (B) were supplied from the top feeder of the twin-screw extruder and melt-kneaded. The methacrylic resin (A-3) was supplied from the side feeder of the twin-screw extruder according to the ratio (% by mass) shown below in Table 1, mixed, and melt-kneaded to obtain a methacrylic resin composition.

Example 7

The same twin-screw extruder as in Example 1 was used. The methacrylic resin (A-5) and the rubber polymer (B-1) were supplied from the top feeder of the twin-screw extruder and melt-kneaded. The methacrylic resin (A-3) was supplied from the side feeder of the twin-screw extruder according to the ratio (% by mass) shown below in Table 1, mixed, and melt-kneaded to obtain a methacrylic resin composition.

Example 8

The same twin-screw extruder as in Example 1 was used. The methacrylic resin (A-4) and the rubber polymer (B-2) were supplied from the top feeder of the twin-screw extruder and melt-kneaded. The methacrylic resin (A-3) was supplied from the side feeder of the twin-screw extruder according to the ratio (% by mass) shown below in Table 1, mixed, and melt-kneaded to obtain a methacrylic resin composition.

Example 9

A twin-screw extruder ($\phi$32 mm, L/D=52, 150 rpm) temperature-set to 210 to 260° C. was used. The methacrylic resin (A-1), the methacrylic resin (A-2), and the rubber polymer (B-1) were dry-blended according to the ratio (% by mass) shown below in Table 1, then collectively supplied from the top feeder of the extruder, and melt-kneaded to obtain a methacrylic resin composition.

Example 10

The same twin-screw extruder as in Example 1 was used. The methacrylic resin (A-4) and the rubber polymer (B-2) were supplied from the top feeder of the twin-screw extruder and melt-kneaded. The methacrylic resin (A-8) was supplied from the side feeder of the twin-screw extruder according to the ratio (% by mass) shown below in Table 1, mixed, and melt-kneaded to obtain a methacrylic resin composition.

Example 11

The same twin-screw extruder as in Example 1 was used. The methacrylic resin (A-7) and the rubber polymer (B-1) were supplied from the top feeder of the twin-screw extruder and melt-kneaded. The methacrylic resin (A-2) was supplied from the side feeder of the twin-screw extruder according to the ratio (% by mass) shown below in Table 1, mixed, and melt-kneaded to obtain a methacrylic resin composition.

Example 12

The same twin-screw extruder as in Example 1 was used. The methacrylic resin (A-7) and the rubber polymers (B-1) and (B-2) were supplied from the top feeder of the twin-screw extruder and melt-kneaded. The methacrylic resin (A-3) was supplied from the side feeder of the twin-screw extruder according to the ratio (% by mass) shown below in Table 1, mixed, and melt-kneaded to obtain a methacrylic resin composition.

Comparative Example 1

The same twin-screw extruder as in Example 1 was used. The methacrylic resin (A-1) and the rubber polymer (B-1) were supplied from the top feeder of the twin-screw extruder and melt-kneaded to obtain a methacrylic resin composition.

Comparative Examples 2 and 3

The same twin-screw extruder as in Example 1 was used. The methacrylic resin (A-6) and the rubber polymer (B-1) were supplied from the top feeder of the twin-screw extruder and melt-kneaded to obtain a methacrylic resin composition.

Comparative Example 4

The same twin-screw extruder as in Example 1 was used. The methacrylic resin (A-3) and the rubber polymer (B-1) were supplied from the top feeder of the twin-screw extruder and melt-kneaded. Then, the methacrylic resin (A-1) was supplied from the side feeder of the twin-screw extruder according to the ratio (% by mass) shown below in Table 1, and melt-kneaded to obtain a methacrylic resin composition.

TABLE 1

| | | Example 1 | Example 2 | Example 3 | Example 4 | Example 5 | Example 6 | Example 7 | Example 8 |
|---|---|---|---|---|---|---|---|---|---|
| | Methacrylic resin (A) | | | | | | | | |
| Ratio (% by mass) | Production Example 1 (A-1) | 50 | 40 | 35 | 25 | 35 | 25 | | |
| | Production Example 2 (A-2) | 15 | | | | | | | |
| | Production Example 3 (A-3) | | 10 | 15 | 25 | 15 | 25 | 30 | 15 |
| | Production Example 4 (A-4) | | | | | | | | 35 |
| | Production Example 5 (A-5) | | | | | | | 10 | |
| | Production Example 6 (A-6) | | | | | | | | |
| | Production Example 7 (A-7) | | | | | | | | |
| | Production Example 8 (A-8) | | | | | | | | |

TABLE 1-continued

| | | Example 1 | Example 2 | Example 3 | Example 4 | Example 5 | Example 6 | Example 7 | Example 8 |
|---|---|---|---|---|---|---|---|---|---|
| Rubber polymer (B) | | | | | | | | | |
| Ratio (% by mass) | B-1 | 35 | 50 | 50 | 50 | | | 60 | |
| | B-2 | | | | | 50 | 50 | | 50 |
| Evaluation | Weight-average molecular weight Mw (ten-thousands place) | 8.6 | 8.9 | 8.5 | 7.1 | 8.1 | 6.7 | 6.5 | 4.9 |
| | Ratio of area of molecular weights of 15000 to 30000 (%) | 15.5 | 14.5 | 16.7 | 22.5 | 17.5 | 24 | 14.1 | 35 |
| | Content of acetone-insoluble portion (% by mass) | 33 | 48 | 48 | 48 | 47 | 47 | 57 | 48 |
| | Average particle size of rubber polymer (μm) | 0.1 | 0.1 | 0.1 | 0.1 | 0.23 | 0.23 | 0.1 | 0.23 |
| | Average number of particles of rubber polymer (Bα) entirely surrounded by other particles of rubber polymer (B) | 3 | 4 | 5 | 5 | 0 | 0 | 5 | 6 |
| | Spiral cavity flow length (cm) | 31 | 28 | 29 | 35 | 24 | 28 | 27 | 34 |
| | Haze (%) | 0.8 | 1.1 | 1 | 0.9 | 1 | 0.9 | 1.1 | 1.2 |
| | ΔYI | 25 | 26 | 26 | 28 | 16 | 19 | 31 | 34 |
| | Vicat softening temperature (°C.) | 93 | 83 | 85 | 85 | 95 | 95 | 83 | 91 |
| | Charpy impact strength (KJ/m$^2$) | 65 | 95 | 98 | 81 | 70 | 68 | 131 | 58 |
| | Variations in impact strength (○-X) | ○ | ○ | ○ | ○ | ○ | ○ | ○ | Δ |

| | | Example 9 | Example 10 | Example 11 | Example 12 | Comparative Example 1 | Comparative Example 2 | Comparative Example 3 | Comparative Example 4 |
|---|---|---|---|---|---|---|---|---|---|
| Methacrylic resin (A) | | | | | | | | | |
| Ratio (% by mass) | Production Example 1 (A-1) | 50 | | | | 50 | | | 25 |
| | Production Example 2 (A-2) | 15 | | 15 | | | | | |
| | Production Example 3 (A-3) | | | | 20 | | | | 25 |
| | Production Example 4 (A-4) | | 25 | | | | | | |
| | Production Example 5 (A-5) | | | | | | | | |
| | Production Example 6 (A-6) | | | | | | 65 | 50 | |
| | Production Example 7 (A-7) | | | 53 | 51 | | | | |
| | Production Example 8 (A-8) | | 25 | | | | | | |
| Rubber polymer (B) | | | | | | | | | |
| Ratio (% by mass) | B-1 | 35 | | 32 | 9 | 50 | 35 | 50 | 50 |
| | B-2 | | 50 | | 20 | | | | |
| Evaluation | Weight-average molecular weight Mw (ten-thousands place) | 8.7 | 4.1 | 7.6 | 6.6 | 10.2 | 11.2 | 10.9 | 7.8 |
| | Ratio of area of molecular weights of 15000 to 30000 (%) | 15 | 45 | 16 | 18 | 9.0 | 13.5 | 13.8 | 24 |
| | Content of acetone-insoluble portion (% by mass) | 33 | 48 | 30 | 27 | 48 | 33 | 48 | 48 |
| | Average particle size of rubber polymer (μm) | 0.1 | 0.23 | 0.1 | 0.1/0.23 | 0.1 | 0.1 | 0.1 | 0.1 |
| | Average number of particles of rubber polymer (Bα) entirely surrounded by other particles of rubber polymer (B) | 6 | 7 | 4 | 5 | 3 | 11 | 20 | 16 |

TABLE 1-continued

| | | | | | | | | |
|---|---|---|---|---|---|---|---|---|
| Spiral cavity flow length (cm) | 30 | 43 | 36 | 38 | 21 | 25 | 23 | 33 |
| Haze (%) | 1.3 | 1.4 | 1.1 | 1.2 | 0.9 | 1.5 | 2.5 | 2.2 |
| ΔYI | 35 | 35 | 30 | 32 | 22 | 39 | 45 | 42 |
| Vicat softening temperature (° C.) | 92 | 85 | 90 | 90 | 85 | 89 | 83 | 92 |
| Charpy impact strength (KJ/m²) | 61 | 45 | 55 | 50 | 97 | 55 | 65 | 71 |
| Variations in impact strength (◯-X) | Δ | Δ | ◯ | ◯ | ◯ | X | X | X |

The methacrylic resin compositions obtained in Examples 1 to 7, 11, and 12 had excellent transparency, fluidity, heat resistance, impact strength, and color, provided favorable dispersibility of the rubber polymer, and were invariable in impact strength.

The methacrylic resin composition of Example 8 had a slightly low weight-average molecular weight and tended to provide slightly lower dispersibility of the rubber polymer than that in Example 5. Although this slightly influenced variations in impact strength, its physical properties were sufficient for practical use.

In Example 9, the starting materials were collectively mixed and then melt-kneaded. Therefore, the methacrylic resin composition tended to provide slightly lower dispersibility of the rubber polymer than that in Example 1, though having favorable balance among physical properties. Although this slightly influenced variations in impact strength, its physical properties were sufficient for practical use.

In Example 10, the methacrylic resin composition had a slightly large ratio of the area of a molecular weight range of 15000 to 30000 in the differential molecular weight distribution curve obtained from the GPC elution curve. Therefore, the methacrylic resin composition tended to provide slightly lower dispersibility of the rubber polymer than that in Example 1, but had physical properties with high fluidity and impact strength.

This application claims a priority based on the Japanese Patent Application No. 2015-046025 filed on Mar. 9, 2015 at the Japan Patent Office, and the Japanese Patent Application No. 2016-007220 filed on Jan. 18, 2016 at the Japan Patent Office, and the entire contents of which are incorporated herein by reference.

The methacrylic resin composition or the molded article of the present embodiment has industrial applicability as a material for optical products, electric or electronical products, furniture, household goods, storage or stockpile goods, construction materials for walls, roofs, etc., toys or playground equipment, hobby equipment such as pachinko boards, medical or welfare products, office automation equipment, audio visible equipment, cells or electrical equipment, lighting equipment, ships, body parts for aircraft structures, and parts for vehicles.

REFERENCE SIGNS LIST

1: GPC elution curve
2: baseline
3: differential molecular weight distribution curve obtained from GPC elution curve
4: baseline

The invention claimed is:

1. A methacrylic resin composition comprising:
(A) a methacrylic resin comprising 70 to 100% by mass of a methacrylic acid ester monomer unit, and 0 to 30% by mass of at least one additional vinyl monomer unit copolymerized with a methacrylic acid ester, and
(B) a rubber polymer having an average particle size of 0.04 to 1.0 μm,
wherein the methacrylic resin composition comprises the methacrylic resin (A) and the rubber polymer (B) at a ratio of 30:70 to 74:26% by mass, and satisfies the following conditions (I) to (III):
(I) a weight-average molecular weight (Mw) measured by the gel permeation chromatography (GPC) of a component dissolved in tetrahydrofuran (THF) is 40000 to 300000;
(II) an area of a molecular weight range of 15000 to 30000 in a differential molecular weight distribution curve obtained from a GPC elution curve is 10 to 70% in terms of a ratio to a total area obtained from the differential molecular weight distribution curve; and
(III) when arbitrary 10 fields of view of the methacrylic resin composition are observed at a magnification of 50000 times under a transmission electron microscope,
a plurality of aggregates each comprising a plurality of particles of the rubber polymer (B) are present,
the plurality of aggregates comprise an aggregate α, and 0 or more and 10 or less rubber polymer particles (Bα) entirely surrounded by other rubber polymer particles are present in the aggregate α, and
an average number of the rubber polymer particles (Bα) is 0 or more and 10 or less per one of the 10 fields of view.

2. The methacrylic resin composition according to claim 1, wherein the rubber polymer (B) is an acrylic rubber polymer.

3. The methacrylic resin composition according to claim 1, wherein the rubber polymer (B) has a multilayer structure having two or more layers.

4. A method for producing the methacrylic resin composition according to claim 1, comprising:
melt-kneading a methacrylic resin having a weight-average molecular weight (Mw) of 40000 to 350000 and the rubber polymer (B) to obtain a mixture and
adding a methacrylic resin having a weight-average molecular weight (Mw) of 5000 to 40000 to the mixture.

5. A molded article comprising the methacrylic resin composition according to claim 1.

6. The molded article according to claim 5, wherein the molded article is an injection-molded article.

7. The molded article according to claim 5, wherein the molded article is an extrusion-molded article.

8. The molded article according to claim 5, wherein the molded article is any article selected from the group consisting of optical components, electrical or electronical components, sundry goods, and parts for vehicles.

9. The molded article according to claim 5, wherein the molded article is a thin long component having a long side of 100 mm or larger and a thickness of 3 mm or smaller.

* * * * *